United States Patent
Li et al.

(10) Patent No.: US 10,925,026 B2
(45) Date of Patent: Feb. 16, 2021

(54) SYNCHRONIZATION INFORMATION SENDING METHOD AND APPARATUS

(71) Applicant: Huawei Technologies Co., Ltd., Shenzhen (CN)

(72) Inventors: Chao Li, Beijing (CN); Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 16/040,299

(22) Filed: Jul. 19, 2018

(65) Prior Publication Data

US 2018/0352525 A1 Dec. 6, 2018

Related U.S. Application Data

(63) Continuation of application No. PCT/CN2016/071507, filed on Jan. 20, 2016.

(51) Int. Cl.

| | |
|---|---|
| *H04W 56/00* | (2009.01) |
| *H04W 4/46* | (2018.01) |
| *H04B 7/185* | (2006.01) |
| *H04B 7/212* | (2006.01) |
| *H04W 76/14* | (2018.01) |
| *H04W 88/04* | (2009.01) |
| *H04W 48/12* | (2009.01) |

(52) U.S. Cl.
CPC .... *H04W 56/0025* (2013.01); *H04B 7/18528* (2013.01); *H04B 7/2125* (2013.01); *H04W 4/46* (2018.02); *H04W 56/00* (2013.01); *H04W 56/004* (2013.01); *H04W 56/0015* (2013.01); *H04W 48/12* (2013.01); *H04W 76/14* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 10,244,493 B2 * | 3/2019 | Seo | H04W 56/00 |
| 10,299,235 B2 * | 5/2019 | Seo | H04J 11/0076 |
| 2013/0077512 A1 | 3/2013 | Chang et al. | |

(Continued)

FOREIGN PATENT DOCUMENTS

| | | |
|---|---|---|
| CN | 102571430 A | 7/2012 |
| CN | 103828398 A | 5/2014 |

(Continued)

OTHER PUBLICATIONS

ZTE "Synchronization for V2V", 3GPP TSG-RAN WG1 #83, R1-156661, XP05100306015, Nov. 2015, Anaheim, USA, 6 pages.

(Continued)

*Primary Examiner* — Xavier S Wong
(74) *Attorney, Agent, or Firm* — Slater Matsil, LLP

(57) ABSTRACT

An embodiment method includes determining, by first user equipment UE, first synchronization information, where the first synchronization information is used to indicate a priority of the first UE used as a synchronization source; and sending, by the first UE, the first synchronization information, so that second UE selects a synchronization source of the second UE according to the received first synchronization information.

18 Claims, 8 Drawing Sheets

(56) References Cited

U.S. PATENT DOCUMENTS

| | | | |
|---|---|---|---|
| 2015/0264588 A1 | 9/2015 | Li et al. | |
| 2015/0271861 A1 | 9/2015 | Li et al. | |
| 2016/0374038 A1 | 12/2016 | Wang | |
| 2017/0367087 A1* | 12/2017 | Seo | H04W 72/10 |
| 2018/0007726 A1* | 1/2018 | Li | |
| 2018/0070217 A1 | 3/2018 | Morita et al. | |
| 2018/0213499 A1* | 7/2018 | Lee | |
| 2018/0242287 A1* | 8/2018 | Chae | H04W 56/001 |
| 2018/0332491 A1* | 11/2018 | Eckardt | |
| 2019/0037513 A1* | 1/2019 | Yang | |

FOREIGN PATENT DOCUMENTS

| | | |
|---|---|---|
| CN | 104284436 A | 1/2015 |
| CN | 104883728 A | 9/2015 |
| KR | 20130029355 A | 3/2013 |
| WO | 2015046264 A1 | 4/2015 |
| WO | 2015066632 A1 | 5/2015 |
| WO | 2015115974 A1 | 8/2015 |

OTHER PUBLICATIONS

LG Electronics "Synchronization Enhancements for UE-to-Network Relay Operation," 3GPP TSG RAN WG1 Meeting #81, R1-152722, XP050973783, May 24, 2015, Japan, 4 pages.

CATT, Design of D2DSS and PD2DSCH. 3GPP TSG RAN WG1 Meeting #78 Dresden, Germany, Aug. 18-22, 2014, R1-142893, 5 pages.

Nokia Networks, Discussion on V2V synchronization source priority. 3GPP TSG-RAN WG1 Meeting #83 Anaheim, USA, Nov. 15-22, 2015, R1-157159, 4 pages.

3GPP TS 36.211 V13.0.0 3rd Generation Partnership Project, Technical Specification Group Radio Access Network, Evolved Universal Terrestrial Radio Access (E-UTRA), Physical channels and modulation (Release 13), Technical Specification, Dec. 2015, 142 pages.

3GPP TS 36.331 V13.0.0 3rd Generation Partnership Project, Technical Specification Group Radio Access Network, Evolved Universal Terrestrial Radio Access (E-UTRA), Radio Resource Control (RRC); Protocol specification (Release 13), Technical Specification, Dec. 2015, 507 pages.

* cited by examiner

| PSSS | PSSS | DMRS | | | DMRS | DMRS | | | | DMRS | SSSS | SSSS | GAP |
|---|---|---|---|---|---|---|---|---|---|---|---|---|---|
| 0 | 1 | 2 | 3 | 4 | 5 | 6 | 0 | 1 | 2 | 3 | 4 | 5 | 6 |

| PSSS | PSSS | DMRS | | DMRS | | | DMRS | DMRS | | | SSSS | SSSS | GAP |
|---|---|---|---|---|---|---|---|---|---|---|---|---|---|
| 0 | 1 | 2 | 3 | 4 | 5 | 6 | 0 | 1 | 2 | 3 | 4 | 5 | 6 |

SYNCHRONIZATION INFORMATION SENDING METHOD AND APPARATUS

CROSS-REFERENCE TO RELATED APPLICATIONS

This application is a continuation of International Application No. PCT/CN2016/071507, filed on Jan. 20, 2016, the disclosure of which is hereby incorporated by reference in its entirety.

TECHNICAL FIELD

The present invention relates to the communications field, and in particular, to a synchronization information sending method and apparatus.

BACKGROUND

In a Device-to-Device (D2D) communications system, to ensure efficiency of communication between UEs, the UEs perform synchronization processing before data receiving and sending. UE 1 is used as an example. The UE 1 may obtain a synchronization signal such as an Sidelink Synchronization Signal (SLSS) from at least one synchronization source, for example, a base station or UE other than the UE 1, and perform synchronization by using a detected synchronization signal sent by another UE.

At present, 3rd Generation Partnership Project (3GPP) is conducting a research on communication between a vehicle and any object, that is, vehicle-to-everything (V2X). Vehicle to Vehicle (V2V) communication in the Internet of Vehicles is the focus of study. Compared with D2D, V2X and V2V have higher requirements for a transmission delay and reliability. Therefore, relatively high precision of synchronization between vehicles is to be ensured. In the current system, a vehicle and a device in a V2X or V2V communications system are used as UEs, and UE synchronization may be implemented in the V2X or V2V communications system using the synchronization method in the D2D system.

However, in the current system, it takes an excessively long time to detect a D2D synchronization signal. For example, it takes several hundreds of milliseconds to synchronize UE with a detected synchronization source. This is inapplicable to an application scenario, similar to the Internet of Vehicles, in which there is a low requirement for a transmission delay and a high requirement for synchronization stability.

Further, in the V2X and V2V communications systems, a synchronization source of UE may be a base station or another UE, or may be a satellite device. Therefore, a scenario of UE synchronization becomes more complex. For example, in a case in which partial network coverage is provided, the UE 1 cannot receive a timing reference that comes from a base station, UE 2 can receive the timing reference that comes from the base station, UE 3 can receive a timing reference that comes from a satellite device, and the timing reference of the base station may also come from the satellite device.

Therefore, embodiments of the present invention is mainly to resolve a problem of determining and selecting a synchronization source for devices in a scenario of ultra-reliable and low latency communications, to ensure relatively high synchronization source reliability and synchronization precision, and further improve efficiency between the devices.

SUMMARY

Embodiments of the present invention provide a synchronization information sending method and apparatus, to ensure relatively high precision of synchronization between devices in a scenario of ultra-reliable and low latency communications, and further improve efficiency of communication between the devices.

To achieve the foregoing objective, the following technical solutions are used in the embodiments of the present invention.

According to a first aspect, an embodiment of the present invention provides a synchronization information sending method. The method includes determining, by a first user equipment UE, first synchronization information. The first synchronization information is used to indicate a priority of the first UE used as a synchronization source. The method further includes sending, by the first UE, the first synchronization information, so that a second UE selects a synchronization source of the second UE according to the received first synchronization information.

It can be understood that, because the first synchronization information may indicate the priority of the first UE used as a synchronization source, when selecting the synchronization source of the second UE, the second UE may select the first UE with a relatively high priority as the synchronization source of the second UE according to multiple pieces of received first synchronization information, so as to ensure reliability and precision of synchronization between UEs in a scenario of ultra-reliable and low latency communications such as the Internet of Vehicles.

In a possible design, before the determining, by first UE, first synchronization information, the method further includes: obtaining, by the first UE, first configuration information from a base station or in a predefined manner, where the first configuration information includes frequency information and/or timing information used for the first UE and a synchronization source of the first UE, and timing of the synchronization source of the first UE comes from a satellite device.

In a possible design, the first synchronization information includes: information indicating whether a frequency of a first link is a frequency of a second link; and/or information indicating whether timing for the second link comes from the satellite device; and/or information indicating whether the timing for the second link is aligned with timing of the satellite device, where the second link is a link between the first UE and the base station, and the first link is a link between the first UE and the second UE.

In this way, when the frequency of the first link is the same as the frequency of the second link and the second UE selects the first UE as the synchronization source, because timing of the second UE is the same as the timing of the base station in the second link, potential interference on a receiver of the base station or a receiver of the first UE in the second link due to a timing difference can be avoided. When the timing for the second link comes from the satellite device and the second UE selects the first UE as the synchronization source, because timing of the second UE is the same as the timing of the base station in the second link, synchronization precision and stability in the first link can be improved.

In a possible design, before the determining, by first UE, first synchronization information, the method further includes: obtaining, by the first UE, second configuration information from a base station or in a predefined manner, where the second configuration information includes coverage area information of a cell in which the first UE is located, and timing of a synchronization source of the first UE is unrelated to the satellite device.

In a possible design, the first synchronization information includes: information indicating a transmit power of the serving cell of the first UE; and/or information indicating a coverage radius of the serving cell of the first UE; and/or information indicating a timing advance TA value between the first UE and the serving cell in the second link.

It can be understood that the first synchronization information may reflect the synchronization source of the first UE and the coverage area information of the cell in which the first UE is located, so that when selecting the synchronization source of the second UE, the second UE can select, as the synchronization source of the second UE according to the first synchronization information, the first UE corresponding to the cell with a relatively small coverage area, thereby reducing or eliminating interference on an uplink receiver of the base station within a cell coverage area with a relatively small radius.

In a possible design, the determining, by first UE, first synchronization information includes: obtaining, by the first UE, the first synchronization information from a base station or in a predefined manner, where the first synchronization information includes a first sidelink synchronization signal SLSS; and the sending, by the first UE, the first synchronization information includes: sending, by the first UE, the first synchronization information if a timing delay between the first UE and the second UE satisfies a preset trigger condition.

If the first UE is located in a first cell, and the second UE is located in a second cell adjacent to the first cell, the preset trigger condition includes at least one of the following: a difference between timing of the first cell and timing of the second cell is higher than a first preset value; timing of the first cell and timing of the second cell are asynchronous; a difference between a coverage radius of the first cell and a coverage radius of the second cell is higher than a second preset value; or a difference between a transmit power of the first cell and a transmit power of the second cell is higher than a third preset value.

Alternatively, if both the first UE and the second UE are located in a first cell, the preset trigger condition is that a TA value of the first UE in the second link is higher than a fourth preset value.

It can be understood that the trigger conditions for sending the first synchronization information by the first UE are added, so that the first UE can be triggered, according to these conditions, to send the SLSS, to better implement synchronization in the first link by using the SLSS that is triggered to be sent in the first link by the UE. This can reduce problems, such as a packet loss or a detection error, that occur between UEs because of a delay difference, thereby improving communication performance in the entire first link.

In a possible design, the first synchronization information is carried on a first-link physical control channel and/or in the SLSS.

In a possible design, the determining, by first UE, first synchronization information includes: receiving, by the first UE, a synchronization signal sent by the second UE; and determining, by the first UE, the first synchronization information if the synchronization signal indicates that the second UE is remote UE and signal quality of the synchronization signal is higher than a preset threshold.

In this way, according to the foregoing process, only the relay UE sends the first synchronization information during data communication between the remote UE and relay UE, regardless of whether the remote UE is within a coverage area of the base station and regardless of signal quality of the relay UE in the second link. This implements synchronization between UEs, and reduces power consumption of the remote UE.

In a possible design, the first synchronization information includes any one of the following: the first synchronization information indicates that timing of the first UE is the same as that of the satellite device, and the first synchronization information includes a sequence indicating that the first UE is inside a network, which means that the first UE comes from inside the network and the timing of the first UE is synchronous with that of the satellite device; the first synchronization information indicates that timing of the first UE is the same as that of the satellite device, and the first synchronization information includes a sequence indicating that the first UE is outside a network, which means that the first UE comes from outside the network and the timing of the first UE is the same as that of the satellite device; the first synchronization information indicates that timing of the first UE is different from that of the satellite device, and the first synchronization information includes a sequence indicating that the first UE is inside a network, which means that the first UE comes from inside the network and the timing of the first UE is different from that of the satellite device; or the first synchronization information indicates that timing of the first UE is different from that of the satellite device, and the first synchronization information includes a sequence indicating that the first UE is outside a network, which means that the first UE is outside the network and uses its own timing.

According to a second aspect, an embodiment of the present invention provides a synchronization information sending method. The method includes determining, by first user equipment UE, first synchronization information. The method further includes sending, in a first link by the first UE, the first synchronization information. The first synchronization information is different from second synchronization information, and the first link is a link between the first UE and second UE.

In a possible design, that the first synchronization information is different from second synchronization information specifically includes at least one of the following: a symbol location, in a synchronization subframe, of a synchronization signal in the first synchronization information is different from a symbol location, in a synchronization subframe, of a synchronization signal in the second synchronization information; a quantity of symbols, in a synchronization subframe, of a synchronization signal in the first synchronization information is different from a quantity of symbols, in a synchronization subframe, of a synchronization signal in the second synchronization information; a sequence used for a synchronization signal in the first synchronization information is different from a sequence used for a synchronization signal in the second synchronization information; a frequency-domain mapping manner of a sequence used for a synchronization signal in the first synchronization information is different from a frequency-domain mapping manner of a sequence used for a synchronization signal in the second synchronization information; or a control channel carrying the first synchronization information is different from a control channel carrying the second synchronization information.

In this way, the first synchronization information in an Internet-of-Vehicles system is set to be different from the second synchronization information in a D2D system, so that when performing synchronization, the second UE used as a receive end can determine whether a subsequent communication service is a D2D service or an Internet-of-Vehicles service. This simplifies detection performed by the first UE or the second UE and avoids unnecessary erroneous detection.

In a possible design, that a sequence used for a synchronization signal in the first synchronization information is different from a sequence used for a synchronization signal in the second synchronization information includes at least one of the following: a first synchronization sequence used for the synchronization signal in the first synchronization information is different from a first synchronization sequence used for the synchronization signal in the second synchronization information; a second synchronization sequence used for the synchronization signal in the first synchronization information is different from a second synchronization sequence used for the synchronization signal in the second synchronization information; or a combination manner of a first synchronization sequence and a second synchronization sequence that are used for the synchronization signal in the first synchronization information is different from a combination manner of a first synchronization sequence and a second synchronization sequence that are used for the synchronization signal in the second synchronization information.

In a possible design, that a frequency-domain mapping manner of a sequence used for a synchronization signal in the first synchronization information is different from a frequency-domain mapping manner of a sequence used for a synchronization signal in the second synchronization information includes: a downlink secondary synchronization sequence in a subframe 5 in a second link is used as a second synchronization sequence, where the second link is a link between the first UE and a base station; and/or an even-number subcarrier and an odd-number subcarrier occupied by the second synchronization sequence are respectively corresponding to sequences corresponding to an odd-number subcarrier and an even-number subcarrier of a secondary synchronization sequence in a subframe 0 or the subframe 5 in the second link.

In a possible design, that a control channel carrying the first synchronization information is different from a control channel carrying the second synchronization information specifically includes at least one of the following: a demodulation reference signal used for the control channel carrying the first synchronization information is different from a demodulation reference signal used for the control channel carrying the second synchronization information; a CRC mask used for the control channel carrying the first synchronization information is different from a CRC mask used for the control channel carrying the second synchronization information; a packet size of the control channel carrying the first synchronization information is different from a packet size of the control channel carrying the second synchronization information; or an initial value or a computing parameter of an initial value, of a scrambling sequence, used for the control channel carrying the first synchronization information is different from an initial value or a computing parameter of an initial value, of a scrambling sequence, used for the control channel carrying the second synchronization information.

In a possible design, that a demodulation reference signal used for the control channel carrying the first synchronization information is different from a demodulation reference signal used for the control channel carrying the second synchronization information includes at least one of the following: a sequence of the demodulation reference signal used for the control channel carrying the first synchronization information is different from a sequence of the demodulation reference signal used for the control channel carrying the second synchronization information; a symbol location of the demodulation reference signal used for the control channel carrying the first synchronization information is different from a symbol location of the demodulation reference signal used for the control channel carrying the second synchronization information; or a quantity of symbols occupied by the demodulation reference signal used for the control channel carrying the first synchronization information is different from a quantity of symbols occupied by the demodulation reference signal used for the control channel carrying the second synchronization information.

For example, in a normal CP case, the control channel carrying the first synchronization information occupies symbols 3 and 6 of a first timeslot and symbols 0 and 3 of a second timeslot in the synchronization subframe, or the control channel carrying the first synchronization information occupies symbols 3 and 5 of a first timeslot and symbols 1 and 3 of a second timeslot in the synchronization subframe; and in an extended CP case, the control channel carrying the first synchronization information occupies symbols 2 and 5 of a first timeslot and a symbol 2 of a second timeslot in the synchronization subframe, or the control channel carrying the first synchronization information occupies symbols 2 and 4 of a first timeslot and symbols 0 and 2 of a second timeslot in the synchronization subframe.

In a possible design, the sending, in a first link by the first UE, the first synchronization information includes: sending, by the first UE, the first synchronization information within a synchronization cycle by using N synchronization subframes, where N is a positive integer not less than 2.

In this way, the first synchronization information is sent within the synchronization cycle by using the N synchronization subframes, so that a quantity of data symbols in the synchronization subframe can be increased while ensuring a quantity of DMRSs. This reduces a bit rate of the control channel, thereby improving performance of detecting the control channel and the first synchronization information by the second UE.

In a possible design, the N synchronization subframes are N adjacent subframes within the synchronization cycle, or a time interval between the N synchronization subframes is 1/N of the synchronization cycle.

In a possible design, the control channel carrying the first synchronization information includes at least M portions, and the M portions are respectively mapped to the N synchronization subframes; or the control channel carrying the first synchronization information is transmitted M times within the synchronization cycle, where M is a positive integer not less than 2.

In a possible design, if the N synchronization subframes include a first synchronization subframe and a second synchronization subframe, a first synchronization sequence in the first synchronization subframe is different from a first synchronization sequence in the second synchronization subframe; and/or a second synchronization sequence in the first synchronization subframe is different from a second synchronization sequence in the second synchronization subframe.

In a possible design, if the N synchronization subframes are a group of synchronization resources, at least two groups of synchronization resources are included within the synchronization cycle; and the sending, in a first link by the first UE, the first synchronization information includes: sending, by the first UE, the first synchronization information by using one of the at least two groups of synchronization resources; and receiving, by the first UE by using another group of synchronization resources in the at least two groups of synchronization resources, third synchronization information sent by another UE.

According to a third aspect, an embodiment of the present invention provides a synchronization information sending method. The method includes obtaining, by second user equipment UE, first synchronization information. The first synchronization information is used to indicate a priority of first UE used as a synchronization source. The method further includes determining, by the second UE according to the first synchronization information, whether to use the first UE as a synchronization source of the second UE.

In a possible design, the first synchronization information includes: information indicating whether a frequency of a first link is a frequency of a second link; and/or information indicating whether timing for the second link comes from a satellite device; and/or information indicating whether the timing for the second link is aligned with timing of the satellite device, where the second link is a link between the first UE and a base station, and the first link is a link between the first UE and the second UE. The determining, by the second UE according to the first synchronization information, whether to use the first UE as a synchronization source of the second UE includes: if the frequency of the first link is the frequency of the second link, using, by the second UE, the first UE as the synchronization source of the second UE; or if the timing for the second link comes from the satellite device, using, by the second UE, the first UE as the synchronization source of the second UE; or if the frequency of the first link is the frequency of the second link and the timing for the second link comes from the satellite device, using, by the second UE, the first UE as the synchronization source of the second UE.

In a possible design, the first synchronization information includes: information indicating a transmit power of a cell in which the first UE is located; and/or information indicating a coverage radius of the cell in which the first UE is located; and/or information indicating a timing advance TA value of the first UE in the second link. The determining, by the second UE according to the first synchronization information, whether to use the first UE as a synchronization source of the second UE includes: if the transmit power of the cell in which the first UE is located is lower than a first threshold, using, by the second UE, the first UE as the synchronization source of the second UE; and/or if the coverage radius of the cell in which the first UE is located is lower than a second threshold, using, by the second UE, the first UE as the synchronization source of the second UE; and/or if the TA value of the first UE in the second link is lower than a third threshold, using, by the second UE, the first UE as the synchronization source of the second UE.

In a possible design, the first synchronization information includes priority information of synchronization sources of different types and synchronization signal quality thresholds of synchronization sources of different types.

In this case, the determining, by the second UE according to the first synchronization information, whether to use the first UE as a synchronization source of the second UE includes: selecting, by the second UE, a synchronization source with a highest priority, and when signal quality of the synchronization source with the highest priority is lower than a signal quality threshold corresponding to the synchronization source with the highest priority, selecting, as the synchronization source of the second UE, a synchronization source whose priority is lower than that of the synchronization source with the highest priority.

In a possible design, the first synchronization information includes timing source information of the first UE and network coverage information of the first UE; and the determining, by the second UE according to the first synchronization information, whether to use the first UE as a synchronization source of the second UE includes: using, by the second UE, the first UE as the synchronization source of the second UE if the timing source information of the first UE indicates that timing of the first UE comes from a satellite device and the network coverage information of the first UE indicates that the first UE is outside a network coverage area.

According to a fourth aspect, an embodiment of the present invention provides a synchronization information sending apparatus. The apparatus includes a determining unit, configured to determine first synchronization information. The first synchronization information is used to indicate a priority of the first UE used as a synchronization source. The apparatus further includes a sending unit, configured to send the first synchronization information, so that second UE selects a synchronization source of the second UE according to the received first synchronization information.

In a possible design, the apparatus further includes: an obtaining unit, configured to obtain first configuration information from a base station or in a predefined manner, where the first configuration information includes frequency information and/or timing information used for the first UE and a synchronization source of the first UE, and timing of the synchronization source of the first UE comes from a satellite device, where the first synchronization information includes: information indicating whether a frequency of a first link is a frequency of a second link; and/or information indicating whether timing for the second link comes from the satellite device; and/or information indicating whether the timing for the second link is aligned with timing of the satellite device, where the second link is a link between the first UE and the base station, and the first link is a link between the first UE and the second UE.

In a possible design, the apparatus further includes: an obtaining unit, configured to obtain second configuration information from a base station or in a predefined manner, where the second configuration information includes coverage area information of a cell in which the first UE is located, and timing of a synchronization source of the first UE is unrelated to the satellite device, where the first synchronization information includes: information indicating a transmit power of the serving cell of the first UE; and/or information indicating a coverage radius of the serving cell of the first UE; and/or information indicating a TA value between the first UE and the serving cell in the second link.

In a possible design, the determining unit is specifically configured to obtain the first synchronization information from a base station or in a predefined manner, where the first synchronization information includes a first sidelink synchronization signal SLSS; and the sending unit is specifically configured to send the first synchronization information if a timing delay between the first UE and the second UE satisfies a preset trigger condition. If the first UE is located in a first cell, and the second UE is located in a second cell adjacent to the first cell, a preset trigger condition includes at least one of the following: a difference between timing of the first cell and timing of the second cell is higher than a first preset value; timing of the first cell and timing of the second cell are asynchronous; a difference between a coverage radius of the first cell and a coverage radius of the second cell is higher than a second preset value; or a difference between a transmit power of the first cell and a transmit power of the second cell is higher than a third preset value. Alternatively, correspondingly, if both the first UE and the second UE are located in a first cell, the preset trigger condition is that a TA value of the first UE in the second link is higher than a fourth preset value.

In a possible design, the first synchronization information is carried on a first-link physical control channel and/or in the SLSS.

In a possible design, the determining unit is configured to: receive a synchronization signal sent by the second UE; and determine the first synchronization information if the synchronization signal indicates that the second UE is remote UE and signal quality of the synchronization signal is higher than a preset threshold.

For example, the first synchronization information includes any one of the following: the first synchronization information indicates that timing of the first UE is the same as that of the satellite device, and the first synchronization information includes a sequence indicating that the first UE is inside a network, which means that the first UE comes from inside the network and the timing of the first UE is synchronous with that of the satellite device; the first synchronization information indicates that timing of the first UE is the same as that of the satellite device, and the first synchronization information includes a sequence indicating that the first UE is outside a network, which means that the first UE comes from outside the network and the timing of the first UE is the same as that of the satellite device; the first synchronization information indicates that timing of the first UE is different from that of the satellite device, and the first synchronization information includes a sequence indicating that the first UE is inside a network, which means that the first UE comes from inside the network and the timing of the first UE is different from that of the satellite device; or the first synchronization information indicates that timing of the first UE is different from that of the satellite device, and the first synchronization information includes a sequence indicating that the first UE is outside a network, which means that the first UE is outside the network and uses its own timing.

According to a fifth aspect, an embodiment of the present invention provides a synchronization information sending apparatus. The apparatus includes a determining unit, configured to determine first synchronization information. The apparatus further includes a sending unit, configured to send, in a first link, the first synchronization information. The first synchronization information is different from second synchronization information, and the first link is a link between the first UE and second UE. The first synchronization information is different from second synchronization information specifically includes at least one of the following: a symbol location, in a synchronization subframe, of a synchronization signal in the first synchronization information is different from a symbol location, in a synchronization subframe, of a synchronization signal in the second synchronization information; a quantity of symbols, in a synchronization subframe, of a synchronization signal in the first synchronization information is different from a quantity of symbols, in a synchronization subframe, of a synchronization signal in the second synchronization information; a sequence used for a synchronization signal in the first synchronization information is different from a sequence used for a synchronization signal in the second synchronization information; a frequency-domain mapping manner of a sequence used for a synchronization signal in the first synchronization information is different from a frequency-domain mapping manner of a sequence used for a synchronization signal in the second synchronization information; or a control channel carrying the first synchronization information is different from a control channel carrying the second synchronization information.

In a possible design, that a sequence used for a synchronization signal in the first synchronization information is different from a sequence used for a synchronization signal in the second synchronization information includes at least one of the following: a first synchronization sequence used for the synchronization signal in the first synchronization information is different from a first synchronization sequence used for the synchronization signal in the second synchronization information; a second synchronization sequence used for the synchronization signal in the first synchronization information is different from a second synchronization sequence used for the synchronization signal in the second synchronization information; or a combination manner of a first synchronization sequence and a second synchronization sequence that are used for the synchronization signal in the first synchronization information is different from a combination manner of a first synchronization sequence and a second synchronization sequence that are used for the synchronization signal in the second synchronization information.

In a possible design, that a frequency-domain mapping manner of a sequence used for a synchronization signal in the first synchronization information is different from a frequency-domain mapping manner of a sequence used for a synchronization signal in the second synchronization information includes: a downlink secondary synchronization sequence in a subframe 5 in a second link is used as a second synchronization sequence, where the second link is a link between the first UE and a base station; and/or an even-number subcarrier and an odd-number subcarrier occupied by the second synchronization sequence are respectively corresponding to sequences corresponding to an odd-number subcarrier and an even-number subcarrier of a secondary synchronization sequence in a subframe 0 or the subframe 5 in the second link.

In a possible design, that a control channel carrying the first synchronization information is different from a control channel carrying the second synchronization information specifically includes at least one of the following: a demodulation reference signal used for the control channel carrying the first synchronization information is different from a demodulation reference signal used for the control channel carrying the second synchronization information; a cyclic redundancy check CRC mask used for the control channel carrying the first synchronization information is different from a CRC mask used for the control channel carrying the second synchronization information; a packet size of the control channel carrying the first synchronization information is different from a packet size of the control channel carrying the second synchronization information; or an initial value or a computing parameter of an initial value, of a scrambling sequence, used for the control channel carrying the first synchronization information is different from an initial value or a computing parameter of an initial value, of a scrambling sequence, used for the control channel carrying the second synchronization information.

In a possible design, that a demodulation reference signal used for the control channel carrying the first synchronization information is different from a demodulation reference signal used for the control channel carrying the second synchronization information includes at least one of the following: a sequence of the demodulation reference signal used for the control channel carrying the first synchronization information is different from a sequence of the demodulation reference signal used for the control channel carrying the second synchronization information; a symbol location of the demodulation reference signal used for the control channel carrying the first synchronization information is different from a symbol location of the demodulation reference signal used for the control channel carrying the second synchronization information; or a quantity of symbols occupied by the demodulation reference signal used for the control channel carrying the first synchronization information is different from a quantity of symbols occupied by the demodulation reference signal used for the control channel carrying the second synchronization information.

For example, in a normal CP case, the control channel carrying the first synchronization information occupies symbols 3 and 6 of a first timeslot and symbols 0 and 3 of a second timeslot in the synchronization subframe, or the control channel carrying the first synchronization information occupies symbols 3 and 5 of a first timeslot and symbols 1 and 3 of a second timeslot in the synchronization subframe; and in an extended CP case, the control channel carrying the first synchronization information occupies symbols 2 and 5 of a first timeslot and a symbol 2 of a second timeslot in the synchronization subframe, or the control channel carrying the first synchronization information occupies symbols 2 and 4 of a first timeslot and symbols 0 and 2 of a second timeslot in the synchronization subframe.

In a possible design, the sending unit is specifically configured to send the first synchronization information within a synchronization cycle by using N synchronization subframes, where N is a positive integer not less than 2.

The N synchronization subframes are N adjacent subframes within the synchronization cycle, or a time interval between the N synchronization subframes is 1/N of the synchronization cycle.

In a possible design, if the N synchronization subframes include a first synchronization subframe and a second synchronization subframe, a first synchronization sequence in the first synchronization subframe is different from a first synchronization sequence in the second synchronization subframe; and/or a second synchronization sequence in the first synchronization subframe is different from a second synchronization sequence in the second synchronization subframe.

In a possible design, the sending unit is specifically configured to: send the first synchronization information by using one of the at least two groups of synchronization resources; and receive, by using another group of synchronization resources in the at least two groups of synchronization resources, third synchronization information sent by another UE.

According to a sixth aspect, an embodiment of the present invention provides a synchronization information sending apparatus. The apparatus includes an obtaining unit, configured to obtain first synchronization information. The first synchronization information is used to indicate a priority of first UE used as a synchronization source. The apparatus further includes a determining unit, configured to determine, according to the first synchronization information, whether to use the first UE as a synchronization source of the second UE.

In a possible design, the determining unit is specifically configured to: if a frequency of the first link is a frequency of the second link, use, by the second UE, the first UE as the synchronization source of the second UE; or if timing for the second link comes from a satellite device, use, by the second UE, the first UE as the synchronization source of the second UE; or if a frequency of the first link is a frequency of the second link and timing for the second link comes from a satellite device, use, by the second UE, the first UE as the synchronization source of the second UE. The first synchronization information includes: information indicating whether the frequency of the first link is the frequency of the second link; and/or information indicating whether the timing for the second link comes from the satellite device; and/or information indicating whether the timing for the second link is aligned with timing of the satellite device, where the second link is a link between the first UE and a base station, and the first link is a link between the first UE and the second UE.

In a possible design, the determining unit is specifically configured to: if a transmit power of a cell in which the first UE is located is lower than a first threshold, use, by the second UE, the first UE as the synchronization source of the second UE; and/or if a coverage radius of the cell in which the first UE is located is lower than a second threshold, use, by the second UE, the first UE as the synchronization source of the second UE; and/or if a TA value of the first UE in the second link is lower than a third threshold, use, by the second UE, the first UE as the synchronization source of the second UE. The first synchronization information includes: information indicating the transmit power of the cell in which the first UE is located; and/or information indicating the coverage radius of the cell in which the first UE is located; and/or information indicating the timing advance TA value of the first UE in the second link.

In a possible design, the determining unit is specifically configured to select a synchronization source with a highest priority, and when signal quality of the synchronization source with the highest priority is lower than a signal quality threshold corresponding to the synchronization source with the highest priority, select, as the synchronization source of the second UE, a synchronization source whose priority is lower than that of the synchronization source with the highest priority, where the first synchronization information includes priority information of synchronization sources of different types and/or synchronization signal quality thresholds of synchronization sources of different types.

In a possible design, the determining unit is specifically configured to use, by the second UE, the first UE as the synchronization source of the second UE if timing source information of the first UE indicates that timing of the first UE comes from a satellite device and network coverage information of the first UE indicates that the first UE is outside a network coverage area, where the first synchronization information includes the timing source information of the first UE and the network coverage information of the first UE.

According to a seventh aspect, an embodiment of the present invention provides UE. The UE includes a processor, a memory, a bus, a commutations interface. The memory is configured to store a computer executable instruction. The processor is connected to the memory by using the bus. When the UE runs, the processor executes the computer executable instruction stored in the memory, so that the UE executes the synchronization information sending method according to any possible design in the first aspect.

According to an eighth aspect, an embodiment of the present invention provides UE. The UE includes a processor, a memory, a bus, a commutations interface, where the memory is configured to store a computer executable instruction. The processor is connected to the memory by using the bus. When the UE runs, the processor executes the computer executable instruction stored in the memory, so that the UE executes the synchronization information sending method according to any possible design in the second aspect.

According to a ninth aspect, an embodiment of the present invention provides UE. The UE includes a processor, a memory, a bus, a commutations interface. The memory is configured to store a computer executable instruction. The processor is connected to the memory by using the bus; and when the UE runs, the processor executes the computer executable instruction stored in the memory, so that the UE executes the synchronization information sending method according to any possible design in the third aspect.

In embodiments of the present invention, names of synchronization information sending apparatuses impose no limitation on the devices. In actual application, these devices may have other names, provided that functions of the devices are similar to those in the present invention and fall within the scope defined by the following claims and equivalent technologies of the present invention.

In addition, for technical effects brought by any design manner in the fourth aspect to the ninth aspect, reference may be made to technical effects brought by various design manners in the first to the third aspects. Details are not described herein again.

These aspects or other aspects of the present invention are described more concisely and understandably in the following embodiments.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

Figure 1:
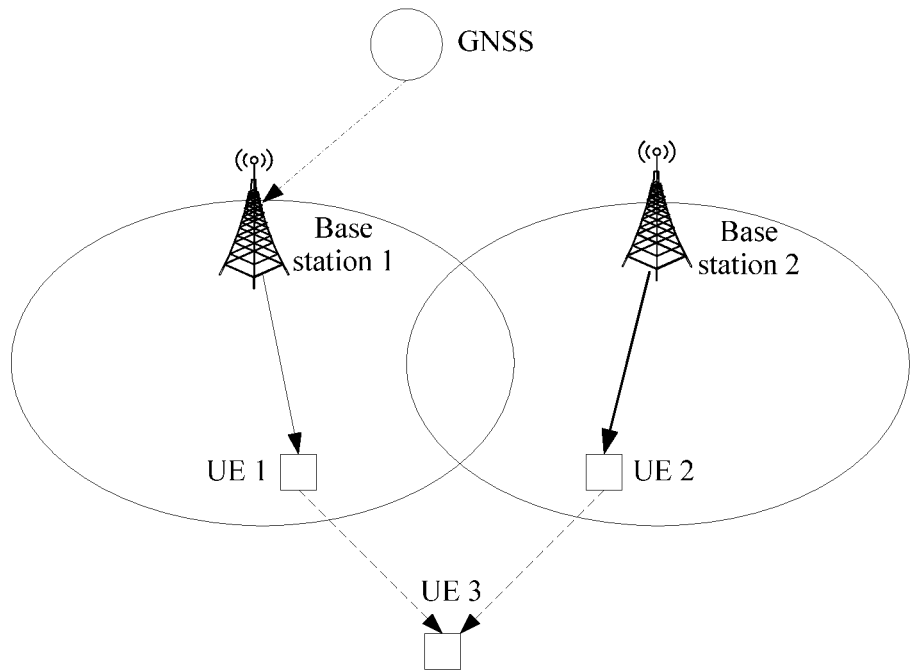
FIG. 1 is a schematic diagram 1 of an application scenario of a synchronization information sending method according to an embodiment of the present invention.

The following describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the present invention, unless otherwise indicated, the meaning of "a plurality of" is at least two.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

Specifically, to clearly describe a synchronization information sending method provided in the embodiments of the present invention, several concepts that may be mentioned in the following embodiments are first described.

UE in the embodiments of the present invention may be specifically an in-vehicle device or a road side unit (RSU), or may be a device such as a mobile phone used by a pedestrian. Alternatively, UE may be classified into relay UE (that is, Relay UE) and remote UE according to a determining condition whether there is a relay link between the UE having a relay function and a base station. A scenario in which the UE is applied is not limited in the present invention.

A D2D system in embodiments of the present invention is a system in which communication is performed in a manner stipulated in the 3GPP protocol Rel-12 or Rel-13. D2D is denoted by a term Proximity-based Services (ProSe) in the protocol.

A first link is a link between UEs. In a D2D system, the first link may be referred to as a D2D link or a sidelink; in the Internet of Vehicles, the first link may be referred to as a V2V link, a Vehicle to person (V2P) link, a vehicle to infrastructure (V2I) link, or a sidelink. The first link in the embodiments of the present invention may be any one of the foregoing links. This is not limited.

In addition, the first link may be used to send information in any one of a broadcast mode, a unicast mode, or a multicast mode.

A second link is a link between UE and a base station, for example, a link between UE and a serving base station that serves the UE, or a link between UE and a neighboring base station. The second link may be referred to as a cellular link. Similarly, the second link may be used to send information in any one of a broadcast mode, a unicast mode, or a multicast mode.

A satellite device, such as a global navigation satellite system (GNSS) may specifically include navigation satellite systems provided by various countries and regions, for example, China's BeiDou Navigation Satellite System, the United States' GPS satellite navigation system, European Galileo satellite navigation system, and Russia's GLONASS satellite navigation system. In addition, the satellite device may include a device whose timing capability is equivalent to that of a satellite. For example, timing precision of a timing device with an atomic clock is equivalent to that of the satellite. The following embodiments of the present invention provide descriptions by using examples in which a GNSS is used as the satellite device.

A synchronization source is a device such as a GNSS, a base station, or UE, with which UE is directly synchronized. For example, when UE 1 is used as a synchronization source, the UE 1 may provide timing information and/or frequency information for another UE. After determining that the UE 1 is a synchronization source of UE 2, the UE 2 may use same timing information and/or frequency information as the UE 1.

First synchronization information is indication information and/or a synchronization signal sent, in a V2X (including V2V) system by a device that can be used as a synchronization source, to UE that needs to be synchronized, and is used to indicate a priority of the device used as a synchronization source, so that the UE to be synchronized determines a synchronization source of the UE itself according to multiple pieces of received first synchronization information. Specific content of the first synchronization information in different application scenarios is detailed in the following embodiments, and therefore is not described herein.

Second synchronization information is synchronization information sent in a sidelink in a manner stipulated in the 3GPP protocol Rel-12 or Rel-13, and may include indication information and/or a synchronization signal sent to UE that needs to be synchronized.

It should be noted that only a V2X system or a V2V system is used as an example for description in the embodiments of the present invention. It should be understood that the synchronization information sending method provided in the embodiments of the present invention may be applied in an application scenario in which synchronization needs to be performed between devices, for example, synchronization between airplanes, synchronization between an airplane and a ship, communication between ships. This is not limited in the embodiments of the present invention.

Specifically, a principle of the synchronization information sending method provided in the embodiments of the present invention is: at least one synchronization source, for example, first UE, may send first synchronization information to second UE that is to be synchronized. Because the first synchronization information may indicate a priority of the first UE used as a synchronization source, when selecting a synchronization source of the second UE, the second UE may select the first UE with a relatively high priority as the synchronization source of the second UE according to multiple pieces of received first synchronization information, so as to ensure reliability and precision of synchronization between UEs in a scenario of ultra-reliable and low latency communications such as the Internet of Vehicles.

The following details the synchronization information sending method, provided in the embodiments of the present invention, in various application applications with reference to the foregoing principle.

Embodiment 1

FIG. 1 shows a specific application scenario of a synchronization information sending method according to this embodiment of the present invention. In this scenario, UE 1 is within a coverage area of a base station 1, a synchronization source of the UE 1 is the base station 1, and timing of the base station 1 comes from a GNSS; UE 2 is within a coverage area of a base station 2, and a synchronization source of the UE 2 is the base station 2; and UE 3 is outside the coverage areas of the base station 1 and the base station 2. In this case, the UE 1 or the UE 2, that is, a first UE, may be used as a synchronization source, and send first synchronization information to the UE 3 that is to be synchronized, that is, a second UE, so that the second UE selects a synchronization source of the second UE according to the first synchronization information.

Figure 2:
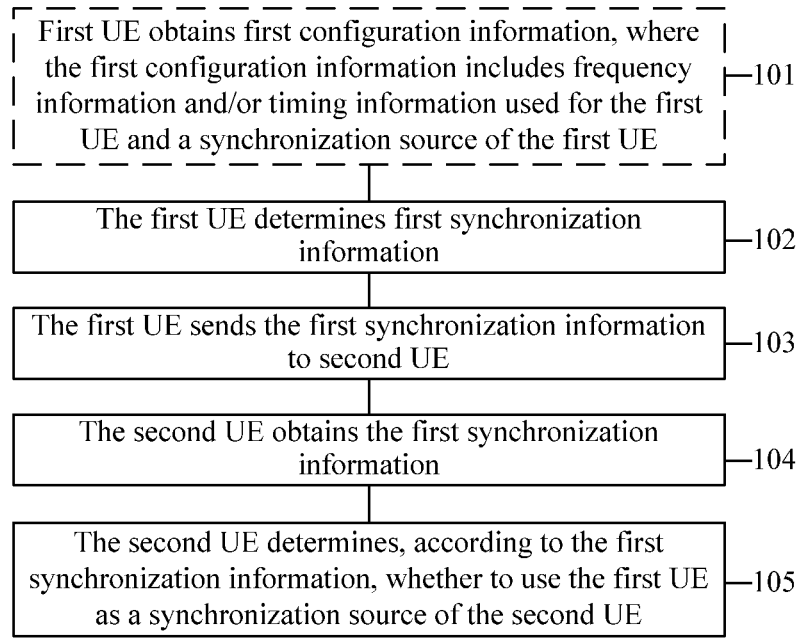
FIG. 2 is a schematic flowchart 1 of a synchronization information sending method according to an embodiment of the present invention.

Specifically, with reference to FIG. 1 that shows the synchronization information sending method according to this embodiment of the present invention, as shown in FIG. 2, the method specifically includes the following steps.

Step 101 (optional). The first UE obtains first configuration information, where the first configuration information includes frequency information and/or timing information used for the first UE and a synchronization source of the first UE.

Optionally, the first UE, for example, the UE 1 or the UE 2 in FIG. 1, may obtain the first configuration information from a base station.

The first configuration information includes the frequency information and/or the timing information used for the first UE and the synchronization source of the first UE.

For example, the first configuration information may be specifically: frequency use information of a first link in which the first UE is located, and/or timing indication information of a second link in which the first UE is located, and/or timing alignment indication information of the first link in which the first UE is located.

For example, the first configuration information is: A frequency spectrum used for the first link in which the first UE is located is within a frequency band of 5 GHz, and timing for the second link in which the first UE is located is aligned with timing of the GNSS.

Step 102. The first UE determines the first synchronization information.

In step 102, the first UE may determine the first synchronization information according to the first configuration information. The first synchronization information specifically includes: information indicating whether a frequency of the first link is a frequency of the second link; and/or information indicating whether timing for the second link comes from the GNSS; and/or information indicating whether the timing for the second link is aligned with timing of the GNSS.

If the frequency of the first link is the same as the frequency of the second link, it may indicate that a priority of the first UE used as a synchronization source is relatively high or relatively low. Similarly, if the timing for the second link comes from the GNSS or the timing for the second link is aligned with the timing of the GNSS, it may indicate that a priority of the first UE used as a synchronization source is relatively high or relatively low.

Alternatively, in step 102, the first UE may obtain the first synchronization information in a predefined manner. For example, a memory of the first UE may prestore the first synchronization information. In this case, the first UE may directly read the first synchronization information from the memory of the first UE.

Step 103. The first UE sends the first synchronization information to the second UE.

Specifically, the first UE sends the first synchronization information to the second UE, where the first synchronization information may be carried on a Physical Sidelink Broadcast Channel (PSBCH) channel and/or in an SLSS.

For example, when an indication is provided in the PSBCH channel, one bit may be used to indicate whether the frequency of the first link is the frequency of the second link. When the bit is 0, the frequency of the first link is different from the frequency of the second link; when the bit is 1, the frequency of the first link is the same as the frequency of the second link. When an indication is provided in the PSBCH channel, one bit may be used to indicate whether timing for the first link comes from the GNSS. When the bit is 0, the timing for the first link does not come from the GNSS; when the bit is 1, the timing for the first link comes from the GNSS. When an indication is provided in the PSBCH channel, one bit may be used to indicate whether timing for the first link is aligned with the timing of the GNSS. When the bit is 0, the timing for the first link is not aligned with the timing of the GNSS; when the bit is 1, the timing for the first link is aligned with the timing of the GNSS. Any one of the foregoing information may be indicated by using an unused reserved field in the PSBCH channel, or may be implicitly indicated by using the PSBCH channel.

In addition, the indication information may be indicated by using the SLSS signal. That is, any one of the foregoing information may be indicated by using two states.

The indication may be specifically provided in any one of the following manners the indication is provided by using different Primary Sidelink Synchronization Signal (PSSS) sequences in the SLSS. Alternatively, the indication is provided by using different Secondary Sidelink Synchronization Signal (SSSS) sequences in the SLSS. Alternatively, the indication is provided by using a combination of different PSSS sequences and SSSS sequences in the SLSS. Alternatively, the indication is provided by using a PSSS and/or SSSS time-domain location and/or a PSSS and/or SSSS frequency-domain location in the SLSS.

In addition, a specific method for sending the first synchronization information by the first UE is detailed in the following embodiments, and therefore is not described herein.

Step 104. The second UE obtains the first synchronization information.

The second UE may be the UE 3 in FIG. 1. The UE 3 is not covered by a network.

Step 105. The second UE determines, according to the first synchronization information, whether to use the first UE as the synchronization source of the second UE.

Specifically, in step 105, if the first synchronization information obtained in step 104 is that the frequency of the first link is the same as the frequency of the second link, the second UE may use the first UE as the synchronization source of the second UE. In this way, when the second UE selects the first UE as the synchronization source, because timing of the second UE is the same as the timing of the base station in the second link, potential interference on a receiver of the base station or a receiver of the UE in the second link due to a timing difference can be avoided.

Alternatively, if the first synchronization information obtained in step 104 is that the timing for the second link comes from the GNSS, the second UE may use the first UE as the synchronization source of the second UE. In this way, when the second UE selects the first UE as the synchronization source, because timing of the second UE is the same as the timing of the base station in the second link, synchronization precision and stability in the first link can be improved.

Alternatively, if the first synchronization information obtained in step 104 is that the timing for the second link is aligned with the timing of the GNSS, the second UE may use the first UE as the synchronization source of the second UE. In this way, when the second UE selects the first UE as the synchronization source, because the timing of the second UE is aligned with the timing of the GNSS, timing of all UEs in the first link is the same, so that communication performance of the UEs in the first link is ensured.

Alternatively, as listed in Table 1, the first synchronization information obtained in step 104 includes information indicating whether the frequency of the first link is the same as the frequency of the second link, and whether the timing for the second link comes from the satellite device.

In this case, the second UE may determine, in a manner listed in Table 1, whether to use the first UE as the synchronization source of the second UE.

TABLE 1

| Whether the frequency of the first link is the same as the frequency of the second link | Whether the timing for the second link comes from the satellite device | Whether the second UE selects the first UE as the synchronization source |
|---|---|---|
| 1 | 1 | Yes or no |
| 1 | 0 | Yes |
| 0 | 1 | Yes |
| 0 | 0 | No |

According to the synchronization information sending method provided in this embodiment of the present invention, based on the application scenario shown in FIG. 1, after obtaining the first configuration information, the first UE determines the first synchronization information, and sends the first synchronization information to the second UE that is to be synchronized. The first synchronization information may reflect a relationship between the frequency of the first link and the frequency of the second link and/or a relationship between the timing for the second link and the timing of the GNSS, so that when selecting the synchronization source of the second UE, the second UE can select the UE with a relatively high priority as the synchronization source of the second UE according to the first synchronization information, so as to improve synchronization reliability and synchronization precision of the second UE.

Embodiment 2

Figure 3:
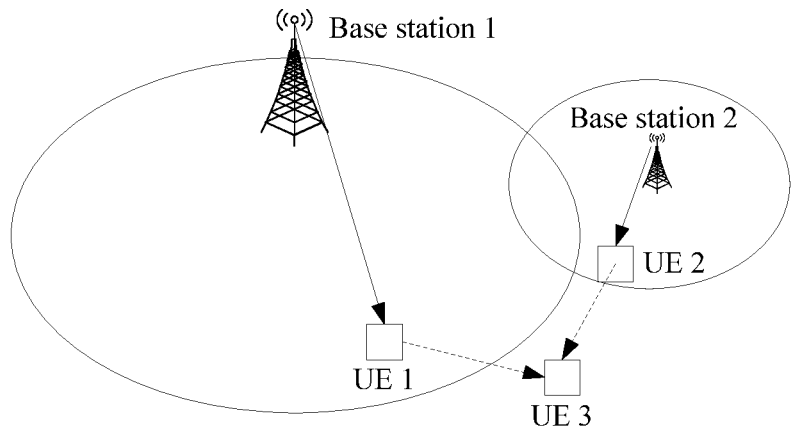
FIG. 3 is a schematic diagram 2 of an application scenario of a synchronization information sending method according to an embodiment of the present invention.

FIG. 3 shows a specific application scenario of a synchronization information sending method according to this embodiment of the present invention. In this scenario, a GNSS is not included, UE 1 is within a coverage area of a base station 1, and a synchronization source of the UE 1 is the base station 1; UE 2 is within a coverage area of a base station 2, and a synchronization source of the UE 2 is the base station 2; and UE 3 is outside the coverage areas of the base station 1 and the base station 2. In this case, the UE 1 or the UE 2, that is, first UE, may be used as a synchronization source, and send first synchronization information to the UE 3 that needs to be synchronized, that is, second UE, so that the second UE selects a synchronization source of the second UE according to the first synchronization information.

A coverage area in the present invention means that UE can receive, by using a second link (a cellular link), a system message that is necessary for communication in a first link and/or the second link and that is sent by a base station, and otherwise, it may be considered that the UE is outside the coverage area.

Figure 4:
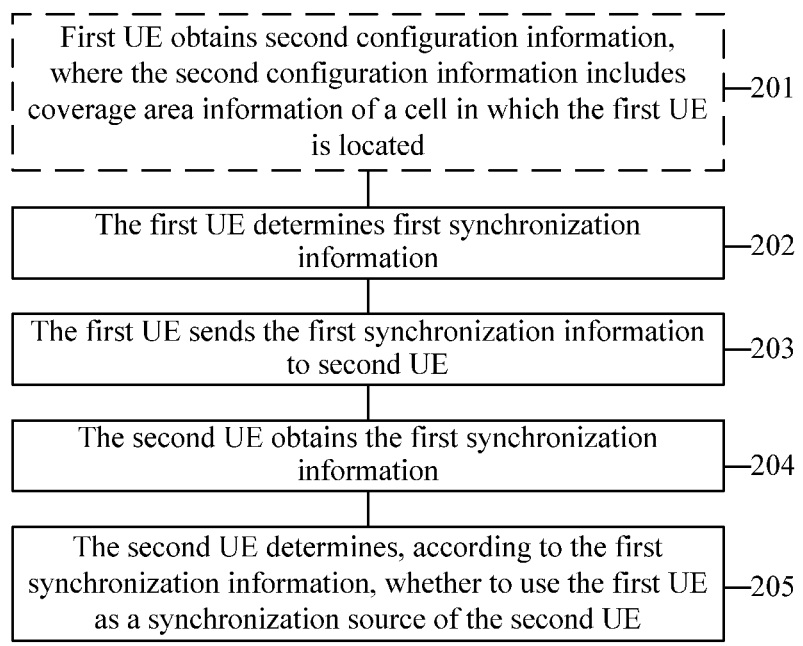
FIG. 4 is a schematic flowchart 2 of a synchronization information sending method according to an embodiment of the present invention.

Specifically, with reference to FIG. 3 that shows the synchronization information sending method according to this embodiment of the present invention, as shown in FIG. 4, the method specifically includes the following steps.

Step 201 (optional). The first UE obtains second configuration information, where the second configuration information includes coverage area information of a cell in which the first UE is located.

Optionally, the first UE, for example, the UE 1 or the UE 2 in FIG. 3, may obtain the second configuration information from the base station.

The second configuration information includes the coverage area information of the cell in which the first UE is located.

For example, the second configuration information may be specifically: transmit power information of the serving cell of the first UE; and/or coverage radius information of the serving cell of the first UE; and/or information about a unidirectional or bidirectional Timing Advance (TA) value between the first UE and the serving cell of the first UE.

The TA value is an accumulated specified advance value between the first UE and the base station, and may be obtained by the UE itself, or may be obtained from information indicated by the base station. The information may reflect the coverage area information of the cell in which the first UE is located. For example, a higher transmit power of the cell in which the first UE is located indicates a larger coverage area of the cell in which the first UE is located.

Step 202. The first UE determines the first synchronization information.

In step 202, the first UE may determine the first synchronization information according to the second configuration information obtained in step 201.

In this case, the first synchronization information may specifically include information indicating a transmit power of the serving cell of the first UE, for example, whether the transmit power of the cell in which the first UE is located is higher than a preset first threshold; information indicating a coverage radius of the serving cell of the first UE, for example, whether the coverage radius of the cell in which the first UE is located is higher than a preset second threshold; and/or information indicating a TA value between the first UE and the serving cell in the second link, for example, whether a unidirectional or bidirectional TA value between the first UE and the serving base station of the first UE is higher than a preset third threshold.

It should be noted that, a smaller coverage radius of the cell in which the first UE is located indicates a higher priority of the first UE used as a synchronization source. When timing of the second UE is the same as timing of the cell with a smaller coverage area, after a potential interference signal reaches the smaller cell, the timing of the second UE is aligned with the timing of the cell. Therefore, no interference is caused to a cell with a larger coverage area. Particularly, when a frequency spectrum used for the first link is an uplink frequency spectrum of the second link, potential interference is caused to a receiver on a base station side in the second link because of transmission in the first link. In terms of a larger cell, a radius of the cell is larger. Therefore, when UE outside a network performs transmission, it is quite impossible to interfere with an uplink receiver on the base station side corresponding to the larger cell.

Alternatively, the first UE may obtain the first synchronization information in a predefined manner. For example, a memory of the first UE may prestore the first synchronization information. In this case, the first UE may directly read the first synchronization information from the memory of the first UE.

Similarly, the first synchronization information may be carried on a PSBCH channel and/or in an SLSS for sending.

Step 203. The first UE sends the first synchronization information to the second UE.

Step 204. The second UE obtains the first synchronization information.

205. The second UE determines, according to the first synchronization information, whether to use the first UE as the synchronization source of the second UE.

Specifically, in step 205, if the transmit power of the cell in which the first UE is located is lower than the first threshold, the second UE uses the first UE as the synchronization source of the second UE; and/or if the coverage radius of the cell in which the first UE is located is lower than the second threshold, the second UE uses the first UE as the synchronization source of the second UE; and/or if the TA value of the first UE in the second link is lower than the third threshold, the second UE uses the first UE as the synchronization source of the second UE.

In addition, the second UE may receive first synchronization information sent by a plurality of first UEs, for example, the UE 3 in FIG. 3 receives the first synchronization information sent by the UE 1 and the UE 2. Therefore, if the first synchronization information sent by the UE 1 and the UE 2 satisfies the foregoing conditions, the UE 3 may select either the UE 1 or the UE 2 as a synchronization source of the UE 3.

Certainly, the first UE may alternatively use the transmit power directly, the coverage radius, or the TA value of the serving cell to which the first UE belongs, as the first synchronization information for sending to the second UE. Then, after comparing different first synchronization information, the second UE may select, as the synchronization source of the second UE, first UE that is corresponding to a cell with a smallest coverage radius and that is indicated in the first synchronization information.

According to the synchronization information sending method provided in this embodiment of the present invention, based on the application scenario shown in FIG. 3, after obtaining the second configuration information, the first UE determines the first synchronization information, and sends the first synchronization information to the second UE that needs to be synchronized. The first synchronization information may reflect a synchronization source of the first UE and the coverage area information of the cell in which the first UE is located, so that when selecting the synchronization source of the second UE, the second UE can select, as the synchronization source of the second UE according to the first synchronization information, the first UE corresponding to the cell with a relatively small coverage area, thereby reducing or eliminating interference on an uplink receiver of the base station within a cell coverage area with a relatively small radius.

Embodiment 3

Figure 5:
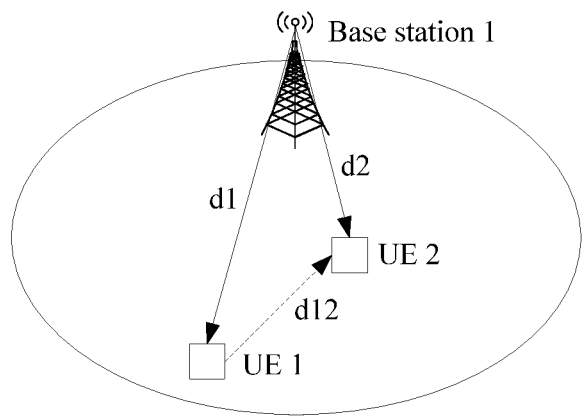
FIG. 5 is a schematic diagram 3 of an application scenario of a synchronization information sending method according to an embodiment of the present invention.

As shown in FIG. 5, FIG. 5 shows a specific application scenario of a synchronization information sending method according to this embodiment of the present invention. Both UE 1 and UE 2 are within a coverage area of a base station 1, and synchronization sources of the UE 1 and the UE 2 are the base station 1, but there is a relatively large difference between a distance d1 and a distance d2, where d1 indicates a distance between the UE 1 and the base station 1, and d2 indicates a distance between the UE 2 and the base station 1. Consequently, a delay difference is caused when the UE 2 receives first synchronization information sent by the UE 1. A distance between the UE 1 and the UE 2 is d12.

The delay difference tau is tau=(d1−d2+d12)/c, where c indicates a speed of light.

For example, if d1=2 km, d2=300 m, and d12=400 m, an equation tau=7 us holds true. If the delay difference is greater than a length of a CP, inter-symbol interference is caused to some extent when the UE 2 detects a signal sent by the UE 1. As a result, signal quality is decreased. In an Internet-of-Vehicles system relatively sensitive to a latency and reliability, if a data packet sent by the UE 1 is not detected by the UE 2, a transmission error occurs. A packet loss is caused because an error occurs for a plurality of times, resulting in a delay increase and a transmission message loss.

In view of this, this embodiment of the present invention provides a synchronization information sending method. First UE (for example, the UE 1 in FIG. 5) may obtain first synchronization information from a base station or in a predefined manner, where the first synchronization information may be a synchronization signal SLSS. In this case, if a TA value between the first UE and a serving base station (that is, the base station 1) of the first UE in a second link is higher than a fourth preset value, the first UE is triggered to send the SLSS. The fourth preset value is indicated by the base station or is preset.

It should be noted that the first UE may send the SLSS in a preset location within a synchronization signal sending cycle, or may send the SLSS in one subframe or several subframes previous to a subframe in which a first-link transmission resource is sent.

Figure 6:
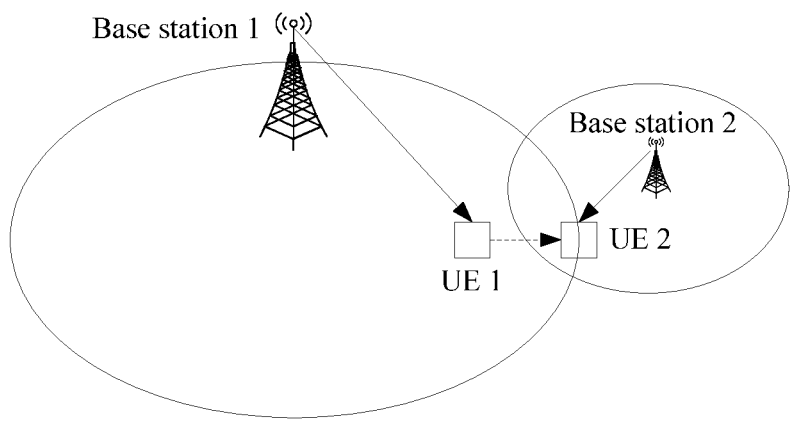
FIG. 6 is a schematic diagram 4 of an application scenario of a synchronization information sending method according to an embodiment of the present invention.

FIG. 6 shows another specific application scenario of a synchronization information sending method according to an embodiment of the present invention. In this application scenario, a base station 1 and a base station 2 are synchronous or asynchronous, and UE 1 and UE 2 are respectively within coverage areas of the base station 1 and the base station 2, but there is a relatively large difference between the coverage area of the base station 1 and the coverage area of the base station 2. In this case, similar to the foregoing application scenario, a delay difference is still caused when the UE 2 receives first synchronization information sent by the UE 1.

Figure 7:
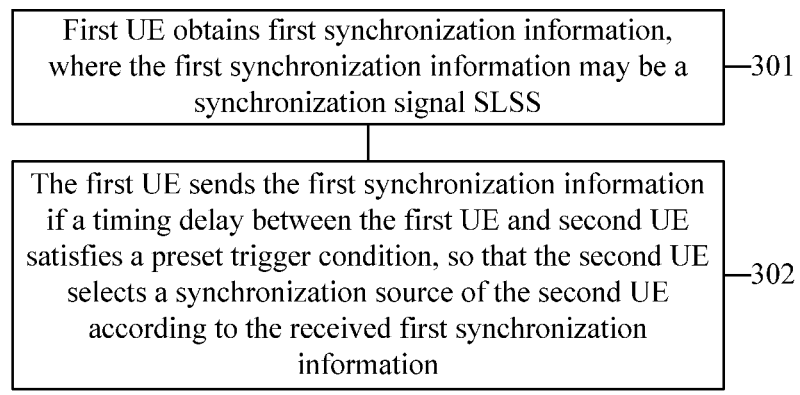
FIG. 7 is a schematic flowchart 3 of a synchronization information sending method according to an embodiment of the present invention.

In view of this, this embodiment of the present invention provides a synchronization information sending method. It is assumed that first UE is located in a first cell, and second UE is located in a second cell adjacent to the first cell. As shown in FIG. 7, the method includes the following steps.

Step 301. The first UE obtains first synchronization information, where the first synchronization information may be a synchronization signal SLSS.

Specifically, the first UE (for example, the UE 1 in FIG. 6) may obtain the first synchronization information from a base station or in a predefined manner, where the first synchronization information may be the synchronization signal SLSS.

Further, the first UE may obtain timing information of the first cell and the second cell; and/or synchronization state information of the first cell and the second cell; and/or coverage radius information of the first cell and the second cell; and/or transmit power information of the first cell and the second cell.

Step 302. The first UE sends the first synchronization information if a timing delay between the first UE and the second UE satisfies a preset trigger condition, so that the second UE selects a synchronization source of the second UE according to the received first synchronization information.

The preset trigger condition includes at least one of the following a difference between timing of the first cell and timing of the second cell is higher than a first preset value; timing of the first cell and timing of the second cell are asynchronous; a difference between a coverage radius of the first cell and a coverage radius of the second cell is higher than a second preset value; or a difference between a transmit power of the first cell and a transmit power of the second cell is higher than a third preset value.

In this way, when the foregoing trigger condition is satisfied, the first UE sends the first synchronization information, that is, sends the SLSS. The first preset value, the second preset value, and the third preset value may be indicated by the base station by using signaling, or may be preset.

It can be understood that in the two application scenarios shown in Embodiment 3, the trigger conditions for sending the first synchronization information by the first UE are added, so that the first UE can be triggered, according to these conditions, to send the SLSS, to better implement synchronization in a first link by using the SLSS that is triggered to be sent in the first link by the UE. This can reduce problems, such as a packet loss or a detection error, that occur between UEs because of a delay difference, thereby improving communication performance in the entire first link.

Embodiment 4

Figure 8:
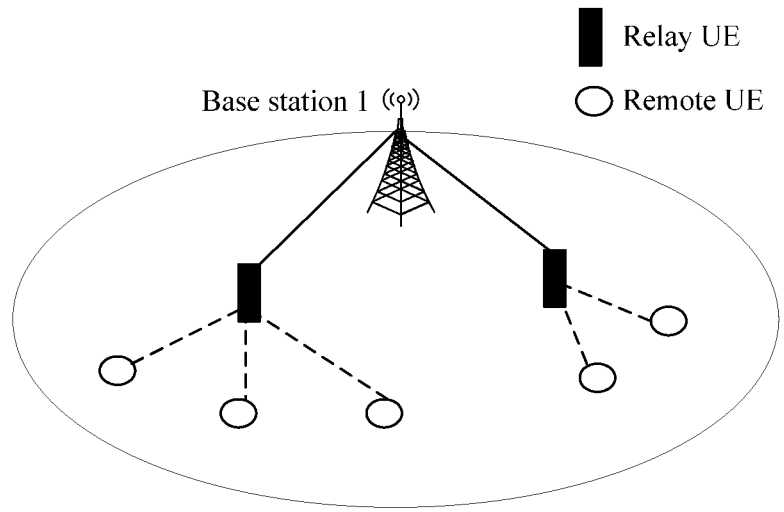
FIG. 8 is a schematic diagram 5 of an application scenario of a synchronization information sending method according to an embodiment of the present invention.

As shown in FIG. 8, FIG. 8 shows a specific application scenario of a synchronization information sending method according to this embodiment of the present invention. In this scenario, there are two types of UEs in a coverage area of a base station 1, that is, relay UE that directly communicates with the base station 1, and remote UE, such as a smart band or another wearable device, that can communicate with the base station 1 by using the relay UE. Optionally, there may be or may not be a direct link between the remote UE and the base station 1.

In this application scenario, if any type of UE can send a first synchronization signal, unnecessary transmission is performed on many occasions, resulting in an increase in power consumption of the remote UE. In addition, due to size and cost restrictions, stability and quality of a crystal oscillator of the remote UE are lower than those of the relay UE. Therefore, communication reliability and performance are improved if timing of the relay UE is used as a reference for synchronization in a link between the relay UE and the remote UE. For example, the stability of the crystal oscillator of the remote UE is approximately 40 ppm, and the stability of the crystal oscillator of the relay UE is kept within 20 ppm.

Figure 9:
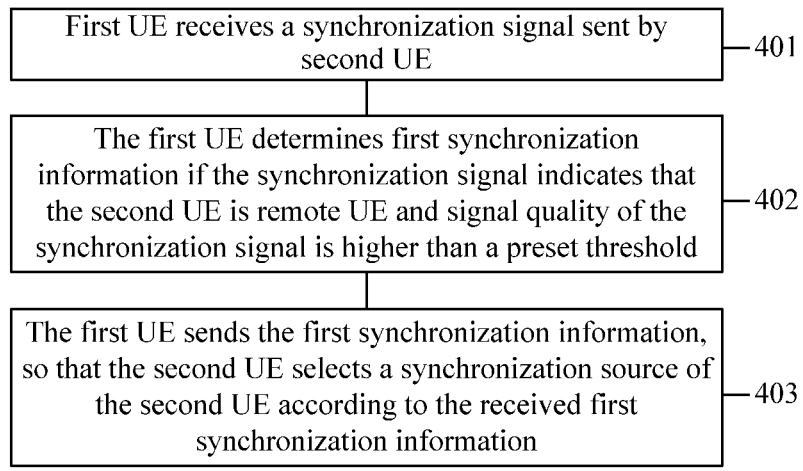
FIG. 9 is a schematic flowchart 4 of a synchronization information sending method according to an embodiment of the present invention.

Specifically, with reference to FIG. 8 that shows the synchronization information sending method according to this embodiment of the present invention, as shown in FIG. 9, the method specifically includes the following steps.

Step 401. First UE receives a synchronization signal sent by second UE.

Specifically, the first UE may be the relay UE in FIG. 8, and the first UE can receive a synchronization signal sent by any type of second UE.

The synchronization signal may be some subsets of SLSS_net, or may be some subsets of SLSS_oon. These subsets are configured by a base station or are preset, and are specially used when the remote UE sends the synchronization signal.

SLSS_net is a set of synchronization signal sequence identifiers and is used to indicate that the first UE is a synchronization source within a network coverage area. SLSS_oon (SLSS out of network) is an SLSS outside the network coverage area.

Step 402. The first UE determines first synchronization information if the synchronization signal indicates that the second UE is remote UE and signal quality of the synchronization signal is higher than a preset threshold.

The preset threshold is configured by the base station or is preset.

In step 402, if the synchronization signal in step 401 indicates that a transmit end, that is, the second UE, is the remote UE, the signal quality of the synchronization signal may be further detected. For example, the signal quality is any one of the following: an Reference Signal Receiving Power (RSRP), an Reference Signal Receiving Quality (RSRQ), or an Received Signal Strength Indicator (RSSI). In this case, the first UE determines the first synchronization information if the signal quality of the synchronization signal is higher than the preset threshold.

For a method for determining the first synchronization information by the first UE, reference may be made to any of the foregoing embodiments. Therefore, details are not described herein again.

Step 403. The first UE sends the first synchronization information, so that the second UE selects a synchronization source of the second UE according to the received first synchronization information.

It can be understood that in the application scenario shown in FIG. 8, according to the foregoing process, only the relay UE sends the first synchronization information during data communication between the remote UE and the relay UE, regardless of whether the remote UE is within the coverage area of the base station and regardless of signal quality of the relay UE in the second link. This implements synchronization between UEs, and reduces power consumption of the remote UE.

Embodiment 5

Figure 10:
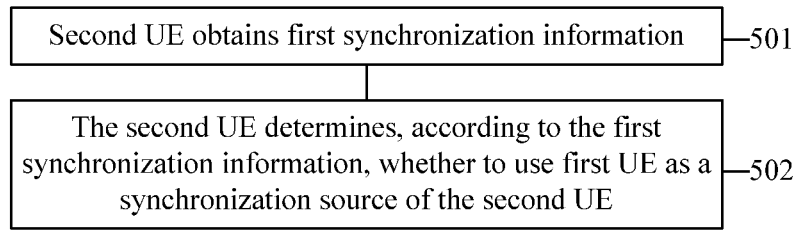
FIG. 10 is a schematic flowchart 5 of a synchronization information sending method according to an embodiment of the present invention.

Specifically, to help second UE to select a higher-precision synchronization source as a synchronization source of the second UE, this embodiment of the present invention provides a synchronization information sending method. As shown in FIG. 10, the method specifically includes the following steps.

Step 501. Second UE obtains first synchronization information.

The first synchronization information may specifically include priority information of synchronization sources of different types and/or synchronization signal quality thresholds of synchronization sources of different types.

For example, it is stipulated in the first synchronization information that a descending order of priorities is as follows:

For a receiver of UE outside a network, an order of priorities of synchronization sources may be: a GNSS, UE synchronized with the GNSS, UE synchronized with a base station, and UE using local timing.

For a receiver of UE inside a network, priorities of synchronization sources may be configured based on a base station, and an order of the priorities may be: the base station, UE synchronized with the base station, a satellite, and UE synchronized with the satellite; or a satellite, the base station, UE synchronized with the base station, and UE synchronized with the satellite.

Synchronization signal quality thresholds corresponding to priorities of various synchronization sources are a threshold 1, a threshold 2, a threshold 3, and a threshold 4. These thresholds may be configured by the base station or may be preset.

Step 502. The second UE determines, according to the first synchronization information, whether to use first UE as a synchronization source of the second UE.

Specifically, if the second UE receives the first synchronization information from the first UE, a synchronization source of the first UE is the GNSS, and the GNSS is of a highest priority, the second UE may preferentially select the first UE as the synchronization source of the second UE.

Further, the second UE determines whether signal quality of the first UE is higher than the threshold 1; and if the signal quality of the first UE is higher than the threshold 1, determines to use the first UE as the synchronization source of the second UE.

If the signal quality of the first UE is not higher than the threshold 1, the second UE may select, according to first synchronization information sent by another UE, a synchronization source whose priority is lower than that of the GNSS; and when signal quality of the synchronization source whose priority is lower than that of the GNSS, use, as the synchronization source of the second UE, the synchronization source whose priority is lower than that of the GNSS.

Particularly, because relatively high synchronization precision is achieved when the GNSS is used as a synchronization source, the first synchronization information may further include timing source information of the first UE and network coverage information of the first UE.

For example, a one-bit in GNSS field may be used as the first synchronization information. When the first synchronization information is "1", it indicates that timing of the first UE comes from the satellite; when the first synchronization information is "0", it indicates that timing of the first UE does not come from the satellite.

For another example, a manner listed in Table 2 may be used to indicate two types of synchronization sources.

TABLE 2

| inGNSS | SLSS | Type of first UE |
| --- | --- | --- |
| "1" | SLSS_oon | UE that is outside a network and whose timing is synchronous with timing of the GNSS or comes from the GNSS |
| "0" | SLSS_oon | UE that is outside a network and whose timing is not synchronous with timing of the GNSS or does not come from the GNSS |
| "1" | SLSS_net | UE that is inside a network and whose timing is synchronous with the GNSS or comes from the GNSS |
| "0" | SLSS_net | UE that is inside a network and whose timing is not synchronous with the GNSS or does not come from the GNSS |

SLSS_oon is a set of synchronization signal sequence identifiers and is used to indicate that the first UE is a synchronization source outside a network coverage area. SLSS_net is a set of synchronization signal sequence identifiers and is used to indicate that the first UE is a synchronization source within a network coverage area.

In this case, the second UE uses the first UE as the synchronization source of the second UE if the timing of the first UE comes from the GNSS and the first UE is outside the network coverage area.

It can be understood that, when receiving synchronization signals sent by a plurality of synchronization sources (that is, a plurality of first UEs), the second UE may select, according to the first synchronization information, the first UE with a relatively high priority and relatively high signal quality as the synchronization source of the second UE, so as to improve synchronization reliability and synchronization precision of the second UE.

Embodiment 6

In each of Embodiment 1 to Embodiment 4, a step of sending first synchronization information by first UE is described. In this embodiment, a specific manner of sending the first synchronization information by the first UE is emphatically described, so that second UE used as a receive end can distinguish, at a physical layer, between synchronization information (referred to as second synchronization information in this embodiment of the present invention) in a D2D system and the first synchronization information, thereby simplifying detection performed by the second UE.

Specifically, a D2D communications protocol is defined in the 3GPP protocol Rel-12 and Rel-13, and the communications protocol is usually used for cellular communication at a frequency spectrum.

In Internet-of-Vehicles communication, more frequency spectrums may be used, for example, an intelligent traffic system (ITS) frequency spectrum, that is, a frequency spectrum around 5.9 GHz. The frequency spectrum is a non-cellular communication frequency spectrum. Certainly, a cellular communication frequency spectrum may alternatively be used in Internet-of-Vehicles communication.

In other words, there is an application scenario: A same frequency spectrum is used in the D2D system and an Internet-of-Vehicles system. Therefore, at a cellular communication frequency spectrum, both a D2D service and an Internet-of-Vehicles service may exist. This embodiment of the present invention is to help the receive end (for example, the second UE) to distinguish between the two services before data is demodulated. Otherwise, the following problem occurs: A D2D receive end receives and demodulates the Internet-of-Vehicles service, and a receive end in the Internet of Vehicles receives and demodulates the D2D service. That is, the two services can be distinguished at a service layer only after demodulation is performed at the physical layer, causing unnecessary detection performed by the receive end and power consumption.

In view of this, this embodiment of the present invention provides a synchronization information sending method, so that whether a subsequent communication service is a D2D service or an Internet-of-Vehicles service can be determined when synchronization is performed between UEs.

Specifically, the method includes: sending, in a first link by the first UE, the first synchronization information, where the first synchronization information is different from the second synchronization information defined in the 3GPP protocol Rel-12 and Rel-13.

That the first synchronization information is different from the second synchronization information specifically includes at least one of the following:

1. A symbol location, in a synchronization subframe, of a synchronization signal in the first synchronization information is different from a symbol location, in a synchronization subframe, of a synchronization signal in the second synchronization information.

2. A quantity of symbols, in a synchronization subframe, of a synchronization signal in the first synchronization information is different from a quantity of symbols, in a synchronization subframe, of a synchronization signal in the second synchronization information.

3. A sequence used for a synchronization signal in the first synchronization information is different from a sequence used for a synchronization signal in the second synchronization information.

4. A frequency-domain mapping manner of a sequence used for a synchronization signal in the first synchronization information is different from a frequency-domain mapping manner of a sequence used for a synchronization signal in the second synchronization information.

5. A control channel carrying the first synchronization information is different from a control channel carrying the second synchronization information.

The following details the five specific cases in which the first synchronization information is different from the second synchronization information.

1. The symbol location, in the synchronization subframe, of the synchronization signal (that is, an SLSS, and the SLSS includes a PSSS and an SSSS) in the first synchronization information is different from the symbol location, in the synchronization subframe, of the synchronization signal in the second synchronization information.

Figure 11:
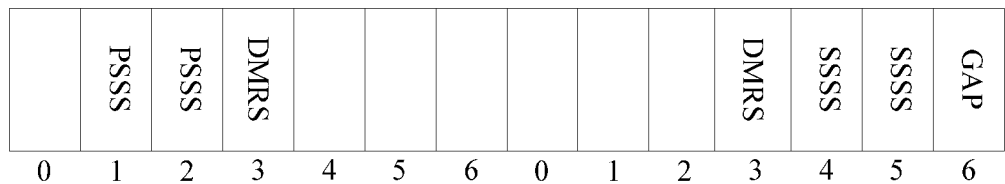
FIG. 11 shows locations of a PSSS and an SSSS in second synchronization information in a normal CP case in the prior art.
Figure 12:
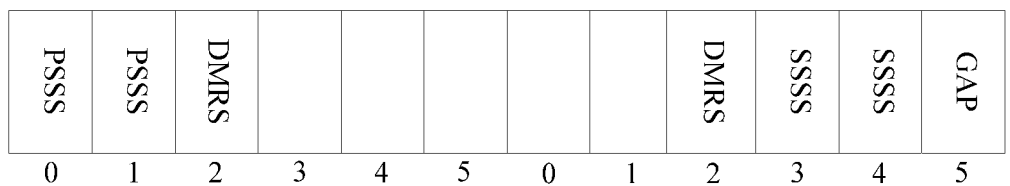
FIG. 12 shows locations of a PSSS and an SSSS in second synchronization information in an extended CP case in the prior art.

Specifically, FIG. 11 shows locations of a PSSS and an SSSS in second synchronization information in a normal Cyclic Prefix (CP) case in the prior art, and FIG. 12 shows locations of a PSSS and an SSSS in second synchronization information in an extended CP case in the prior art.

In the present invention, in a normal CP case, a symbol location of a PSSS in the second synchronization information may be moved: A PSSS in a symbol 1 of a first timeslot in FIG. 11 is mapped to another symbol of the first timeslot, for example, a symbol 0, 4, 5, or 6, to obtain a PSSS in the first synchronization information. Alternatively, a symbol location of a PSSS in the second synchronization information may be moved: A PSSS in a symbol 2 of a first timeslot in FIG. 11 is mapped to another symbol of the first timeslot, for example, a symbol 0, 4, 5, or 6, to obtain a PSSS in the first synchronization information. GAP indicates that no signal is sent.

In the present invention, in an extended CP case, a symbol location of a PSSS in the second synchronization information may be moved: A PSSS in a symbol 0 of a first timeslot in FIG. 12 is mapped to another symbol of the first timeslot, for example, a symbol 3, 4, or 5, to obtain a PSSS in the first synchronization information. Alternatively, a symbol location of a PSSS in the second synchronization information may be moved: A PSSS in a symbol 1 of a first timeslot in FIG. 12 is mapped to another symbol of the first timeslot, for example, a symbol 3, 4, or 5, to obtain a PSSS in the first synchronization information.

Similarly, in a normal CP case, a symbol location of an SSSS in the second synchronization information may be moved: SSSS's in symbols 4 and 5 of a second timeslot in FIG. 11 are mapped to two consecutive data symbols in a synchronization subframe, for example, symbols 4 and 5 in a timeslot 1, symbols 5 and 6 in a timeslot 1, a symbol 6 in a timeslot 1 and a symbol 0 in a timeslot 2, symbols 0 and 1 in a timeslot 2, or symbols 1 and 2 in a timeslot 2, to obtain an SSSS in the first synchronization information finally. Alternatively, a symbol location of an SSSS in the second synchronization information may be moved: An SSSS in a symbol 4 or a symbol 5 of a second timeslot in FIG. 11 is mapped to another data symbol location in a subframe, to obtain an SSSS in the first synchronization information finally.

In an extended CP case, a symbol location of an SSSS in the second synchronization information may be moved: SSSS's in symbols 3 and 4 of a second timeslot in FIG. 12 are mapped to two consecutive data symbols in a synchronization subframe, for example, symbols 3 and 4 in a timeslot 1, a symbol 5 in a timeslot 1 and a symbol 0 in a timeslot 2, or symbols 0 and 1 in a timeslot 2, to obtain an SSSS in the first synchronization information. Alternatively, a symbol location of an SSSS in the second synchronization information may be moved: An SSSS in a symbol 3 or a symbol 4 of a second timeslot in FIG. 12 is mapped to another data symbol location in a subframe, to obtain an SSSS in the first synchronization information finally.

It should be noted that, after the symbol location of the SSSS is moved, a data symbol is added to an original location of the SSSS. Similarly, after the symbol location of the PSSS is moved, a data symbol is added to an original symbol location of the PSSS.

2. The quantity of symbols, in the synchronization subframe, of the synchronization signal in the first synchronization information is different from the quantity of symbols, in the synchronization subframe, of the synchronization signal in the second synchronization information.

For example, in a normal CP case, an original location of a PSSS is unchanged, and one or two PSSS symbols may be added to a symbol 0 and/or a symbol 3 of a first timeslot in a synchronization subframe. Alternatively, an original location of an SSSS is unchanged, and one or two SSSS symbols may be added to a symbol 2 and/or a symbol 3 of a second timeslot in a synchronization subframe.

In addition, a Demodulation Reference Signal (DMRS) may be moved to a symbol 5 of a first timeslot in a synchronization subframe and a symbol 1 of a second timeslot in the synchronization subframe.

In an extended CP case, an original location of a PSSS is unchanged, and one PSSS symbol may be added to a symbol 3 of a first timeslot in a synchronization subframe. Alternatively, an original location of an SSSS is unchanged, and one SSSS symbol may be added to a symbol 2 of a second timeslot in a synchronization subframe.

Similarly, a DMRS may be moved to both a symbol 4 of a first timeslot in a synchronization subframe and a symbol 0 of a second timeslot in the synchronization subframe.

In this way, performance of demodulating a synchronization signal in an entire synchronization subframe can be improved by increasing a quantity of PSSSs and SSSSs in the synchronization signal.

3. The sequence used for the synchronization signal in the first synchronization information is different from the sequence used for the synchronization signal in the second synchronization information.

Specifically, the foregoing difference lies in one or more aspects as follows. A first synchronization sequence used for the synchronization signal in the first synchronization information is different from a first synchronization sequence used for the synchronization signal in the second synchronization information. Alternatively, a second synchronization sequence used for the synchronization signal in the first synchronization information is different from a second synchronization sequence used for the synchronization signal in the second synchronization information. Alternatively, a combination manner of a first synchronization sequence and a second synchronization sequence that are used for the synchronization signal in the first synchronization information is different from a combination manner of a first synchronization sequence and a second synchronization sequence that are used for the synchronization signal in the second synchronization information.

For example, a second synchronization sequence used in current system D2D is generated in the following manner: For a PSSS synchronization sequence, in a current system D2D communications technology, the PSSS sequence is generated by using a Zadoff-Chu sequence with a length of 63, and root sequences 26 and 37 are used for the PSSS sequence. In embodiments of the present invention, root sequences (that is, the first synchronization sequence) different from the root sequences 26 and 37 may be used, for example, root sequences x and y, where x and y are values different from 26 and 37.

Alternatively, a sequence different from that in D2D communication may be used. For example, an m sequence, a Gold sequence, or another pseudo-random sequence is used.

Alternatively, different ZC sequences may be used for two PSSS symbols in the first synchronization information. For example, a ZC sequence with a root number (26, 37) or (37, 26) or a sequence with a root number (X, Y) is used for each of the two adjacent PSSSs, where X is not equal to Y.

For an SSSS synchronization sequence, in the current system D2D communications technology, a system in which a secondary synchronization sequence is the same as that in an Long Term Evolution (LTE) system is used for the SSSS sequence. The SSSS sequence in effect is a Gold sequence generated by using an m sequence with a length of 31, and corresponding sequence numbers are 0 to 167.

A sequence used in the D2D communications technology may also be used for an SSSS in the first synchronization information in the Internet of Vehicles, but sequence numbers may be numbers, larger than 167, of sequences reserved for the LTE system.

Alternatively, different SSSS sequence numbers may be mapped to symbols in which two SSSS sequences are located, or mapping sequences to subcarriers is performed in different manners. For example, SSSS sequences in a subframe 0 and a downlink subframe 5 of each downlink system frame in the LTE system are used, or the following different manners of mapping sequences to subcarriers are used.

4. The frequency-domain mapping manner of the sequence used for the synchronization signal in the first synchronization information is different from the frequency-domain mapping manner of the sequence used for the synchronization signal in the second synchronization information.

Specifically, a downlink secondary synchronization sequence in a subframe 5 of each system frame in a cellular downlink in the LTE system may be used as the second synchronization sequence; and/or an even-number subcarrier and an odd-number subcarrier occupied by the second synchronization sequence are respectively corresponding to sequences on an odd-number subcarrier and an even-number subcarrier of a secondary synchronization sequence in a subframe 0 or the subframe 5 in a second link.

For example, in the current system D2D communications technology, a sequence in a subframe 0 of each system subframe in an LTE cellular downlink is used for the SSSS sequence in the second synchronization information, and a mapping manner is shown in the following formula (1):

$$d(2n)=s_0^{(m0)}(n)c_0(n)$$

$$d(2n+1)=s_1^{(m1)}(n)c_1(n)z_1^{(m0)}(n) \qquad (1),$$

where $d(2n)$ indicates a sequence mapped to an even-number subcarrier, $d(2n+1)$ indicates a sequence mapped to an odd-number subcarrier, $s_0^{(m0)}(n)$ and $c_0(n)$ are sequences for generating $d(2n)$, and $s_1^{(m1)}(n)$, $c_1(n)$, and $z_1^{(m0)}(n)$ are sequences for generating $d(2n+1)$.

In this embodiment of the present invention, optional methods are as follows:

A method 1 is: A sequence in an LTE subframe 0 may be used as the SSSS sequence in the first synchronization information, but sequences mapped to an odd-number subcarrier and an even-number subcarrier are interchanged. In this case, a mapping manner is shown in the following formula (2):

$$d(2n)=s_1^{(m1)}(n)c_1(n)z_1^{(m0)}(n)$$

$$d(2n+1)=s_0^{(m0)}(n)c_0(n) \qquad (2)$$

A method 2 is: A sequence in an LTE subframe 5 may be used as the SSSS sequence in the first synchronization information, and specific implementations are as follows:

A first mapping manner: This mapping manner is similar to that in the formula (1), and is shown in the following formula (3):

$$d(2n)=s_1^{(m1)}(n)c_0(n)$$

$$d(2n+1)=s_0^{(m0)}(n)c_1(n)z_1^{(m1)}(n) \qquad (3)$$

A second mapping manner: Compared with the foregoing formula (3), sequences corresponding to an odd-umber subcarrier and an even-number subcarrier are interchanged. In this case, the mapping manner is shown in the following formula (4):

$$d(2n)=s_0^{(m0)}(n)c_1(n)z_1^{(m1)}(n)$$

$$d(2n+1)=s_1^{(m1)}(n)c_0(n) \qquad (4)$$

5. The control channel carrying the first synchronization information is different from the control channel carrying the second synchronization information.

In a specific embodiment, the control channel herein may be a PSBCH channel carrying the first synchronization information.

Specifically, the foregoing difference lies in one or more aspects as follows:

(1) A demodulation reference signal used for the control channel carrying the first synchronization information is different from a demodulation reference signal used for the control channel carrying the second synchronization information.

For example, a sequence of the demodulation reference signal used for the control channel carrying the first synchronization information is different from a sequence of the demodulation reference signal used for the control channel carrying the second synchronization information; or a symbol location of the demodulation reference signal used for the control channel carrying the first synchronization information is different from a symbol location of the demodulation reference signal used for the control channel carrying the second synchronization information; or a quantity of symbols occupied by the demodulation reference signal used for the control channel carrying the first synchronization information is different from a quantity of symbols occupied by the demodulation reference signal used for the control channel carrying the second synchronization information.

Figure 13:
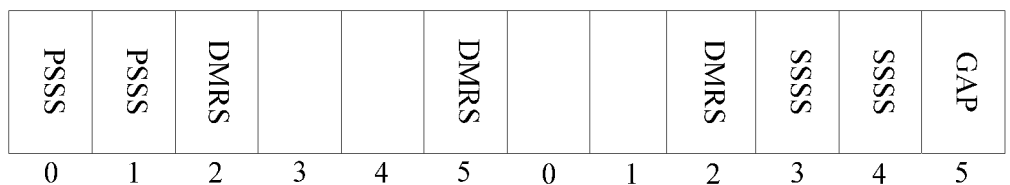
FIG. 13 is a schematic location diagram of a DMRS symbol in first synchronization information in an extended CP case according to an embodiment of the present invention.
Figure 14:
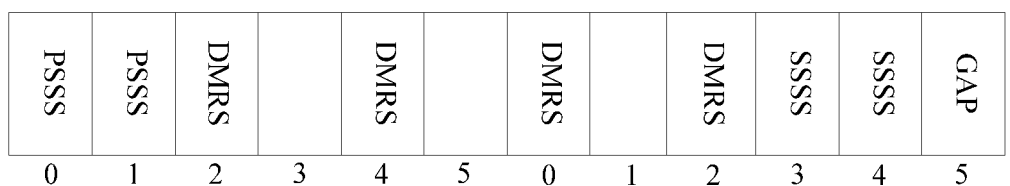
FIG. 14 is another schematic location diagram of a DMRS symbol in first synchronization information in an extended CP case according to an embodiment of the present invention.

In a possible design, for an extended CP subframe, as shown in FIG. 13, there is a newly added DMRS symbol in a symbol 5 of a timeslot 1 in a synchronization subframe. As shown in FIG. 14, there is a newly added DMRS symbol in each of a symbol 4 of a timeslot 1 and a symbol 0 of a timeslot 2 in a synchronization subframe.

Figures 15, 16, 17:
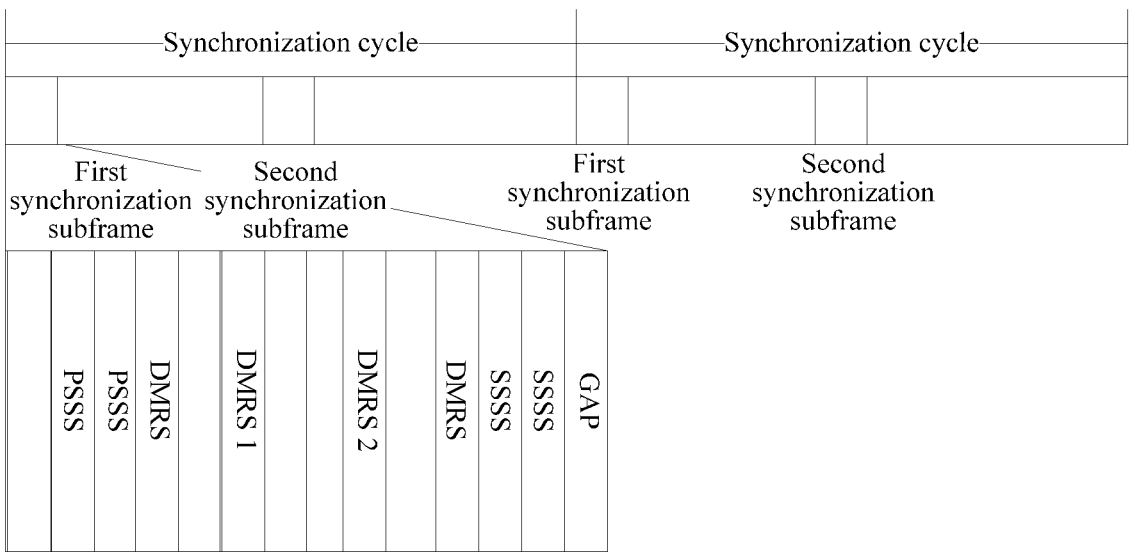
FIG. 15 is a schematic location diagram of a DMRS symbol in first synchronization information in a normal CP case according to an embodiment of the present invention.
FIG. 16 is another schematic location diagram of a DMRS symbol in first synchronization information in a normal CP case according to an embodiment of the present invention.
FIG. 17 is a schematic diagram 1 for sending first synchronization information by using two synchronization subframes according to an embodiment of the present invention.

In another possible design, for a normal CP subframe, as shown in FIG. 15, a DMRS symbol may be added to a symbol 6 of a timeslot 1, and a DMRS symbol may be added to a symbol 0 of a timeslot 2. As shown in FIG. 16, a DMRS symbol may be added both to a symbol 6 of a timeslot 1 and a symbol 0 of a timeslot 2, and a DMRS symbol may be added both to a symbol 5 of a timeslot 1 and a symbol 1 of a timeslot 2.

Optionally, two PSSS symbols in the symbol 1 and the symbol 2 of the timeslot 1 may be added to the symbol 0 and the symbol 1.

In this way, optimal performance of estimating all data symbols by using DMRSs can be ensured. In addition, in a first timeslot, after a PSSS is moved to a location of the symbol 0, there is no data symbol in the symbol 0, and a data symbol in the symbol 2 is adjacent to a DMRS, so that performance of estimating a data symbol can be ensured. This can improve communication performance of a vehicle when the vehicle is moving in the Internet of Vehicles at high speed.

(2) A Cyclic Redundancy Check (CRC) mask used for the control channel carrying the first synchronization information is different from a CRC mask used for the control channel carrying the second synchronization information.

In the D2D system, a 16-bit CRC is used for the PSBCH channel, and no CRC mask is used. That is, a CRC mask has a length of 16 all-zero bits.

For example, in the Internet of Vehicles, a CRC mask with a length of 16 non-all-zero bits may be added to the control channel carrying the first synchronization information, so as to distinguish between the PSBCH in the D2D system and a PSBCH in the Internet of Vehicles.

For example, a CRC mask of a PSBCH of the first synchronization information in the Internet of Vehicles and a CRC mask of a PSBCH of the second synchronization information in the D2D system are listed in Table 3.

TABLE 3

| PSBCH type | CRC mask of a PSBCH |
| --- | --- |
| PSBCH in the D2D system | 0000000000000000 |
| PSBCH used in the present invention | 16 none-all-zero bits, for example, 0000000011111111 |

(4) A packet size of the control channel carrying the first synchronization information is different from a packet size of the control channel carrying the second synchronization information.

For example, in the D2D system, a packet size of the PSBCH channel is 40 bits; in the Internet-of-Vehicles system, a packet size of the PSBCH channel may be increased or decreased, so that the receive end, that is, the second UE, cannot correctly detect the PSBCH channel used by the transmit end.

(5) An initial value or a computing parameter of an initial value, of a scrambling sequence, used for the control channel carrying the first synchronization information is different from an initial value or a computing parameter of an initial value, of a scrambling sequence, used for the control channel carrying the second synchronization information.

At present, an initial value, of a scrambling sequence, used for the PSBCH channel in the D2D system is $N_{ID}^{SL}$; an initial value used for the PSBCH in the Internet-of-Vehicles system may be modified to an ID used in the Internet-of-Vehicles system, for example, $N_{ID}^{VL}$. The ID is different from an ID used in the D2D system.

Alternatively, an initial value of a scrambling sequence in the Internet of Vehicles system may be set to a value other than $N_{ID}^{SL}$, for example, $N_{ID}^{SL}+\Delta$, where $\Delta$ is a non-zero constant.

According to the synchronization information sending method provided in this embodiment of the present invention, the first synchronization information in the Internet-of-Vehicles system is set to be different from the second synchronization information in the D2D system, so that when performing synchronization, the second UE used as the receive end can determine whether a subsequent communication service is a D2D service or an Internet-of-Vehicles service. This simplifies detection performed by the first UE or the second UE and avoids unnecessary erroneous detection.

Embodiment 7

In Embodiment 6, a specific method for sending first synchronization information is provided. The first synchronization information may be carried on a control channel in a synchronization subframe, for example, a PSBCH channel, and a quantity of DMRSs in the synchronization subframe may be increased to at least three. In this case, a quantity of usable data symbols is decreased, and a bit rate of the PSBCH channel is increased. As a result, detection performance of a receive end, that is, second UE, deteriorates.

In addition, a synchronization cycle in a current system D2D system is 40 ms. It takes several hundreds of milliseconds to synchronize a receiver (for example, second UE) with a synchronization signal, and consequently, it takes an excessively long time to detect a signal. A root cause is that performance of an existing D2D synchronization signal is undesirable.

In view of this, this embodiment of the present invention provides a first-synchronization-information sending method. Because first synchronization information is sent periodically, within a synchronization cycle, the first synchronization information may be sent by using N synchronization subframes, where N is a positive integer not less than 2.

Specifically, for a specific manner of sending the first synchronization information in each synchronization subframe, reference may be made to the method provided in Embodiment 6. Therefore, details are not described herein again.

The N synchronization subframes may be N adjacent subframes within the synchronization cycle, or a time interval between the N synchronization subframes is 1/N of the synchronization cycle.

Preferably, as shown in FIG. 17, two synchronization subframes (that is, a first synchronization subframe and a second synchronization subframe) may be used to send the first synchronization information. In addition, synchronization signals in the two subframes may be the same or may be different.

For example, two synchronization subframes (that is, the first synchronization subframe and the second synchronization subframe) are used to send the first synchronization information. A first synchronization sequence in the first synchronization subframe is different from a first synchronization sequence in the second synchronization subframe; and/or a second synchronization sequence in the first synchronization subframe is different from a second synchronization sequence in the second synchronization subframe.

For example, synchronization signals in the first synchronization subframe and the second synchronization subframe are exactly the same. For example, primary synchronization signals are the same, and signals in an LTE secondary synchronization subframe 1 is used as secondary synchronization signals.

Alternatively, synchronization signals in the first synchronization subframe and the second synchronization subframe are different. For example, primary synchronization signals are different. That is, a primary synchronization signal in the first synchronization subframe may be different from a primary synchronization signal in the second synchronization subframe, where the two primary synchronization signals are in a same symbol. Alternatively, a secondary synchronization signal in an LTE subframe 0 and a secondary synchronization signal in an LTE subframe 5 may be respectively used in the first synchronization subframe and the second synchronization subframe.

In the foregoing application scenario in which the first synchronization information is sent by using the N synchronization subframes, a mapping method for a control channel such as a PSBCH channel is as follows:

a control channel carrying the first synchronization information includes at least M portions, and the M portions are respectively mapped to the N synchronization subframes; or a control channel carrying the first synchronization information is transmitted M times within the synchronization cycle, where M is a positive integer not less than 2.

For example, two synchronization subframes (that is, the first synchronization subframe and the second synchronization subframe) are used to send the first synchronization information. Mapping the control channel to the two subframes may be as follows:

Same portions of content about the PSBCH channel may be respectively mapped to the first synchronization subframe and the second synchronization subframe. That is, two same portions of content about one channel are sent.

Alternatively, channel coding, CRC, and modulation (such as QPSK) may be performed on one portion of content about the PSBCH channel, a processed PSBCH channel is divided into two portions, and the two portions are respectively mapped to the first synchronization subframe and the second synchronization subframe. That is, two different portions about one channel are respectively mapped to two subframes and are sent.

Figure 18:
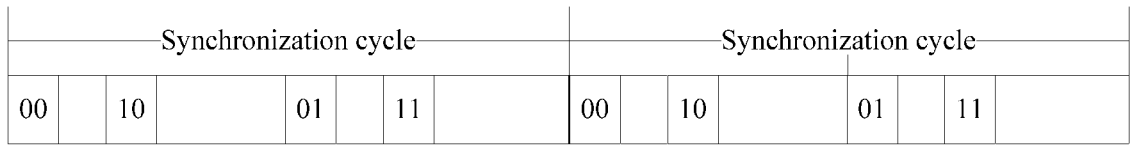
FIG. 18 is a schematic diagram 2 for sending first synchronization information by using two synchronization subframes according to an embodiment of the present invention.

Further, if the N synchronization subframes may be used as a group of synchronization resources, at least two groups of synchronization resources may be included in the synchronization cycle. As shown in FIG. 18, a subframe 00 and a subframe 01 are used as a group of synchronization resources, and a subframe 10 and a subframe 11 are used as another group of synchronization resources.

In this case, when sending the first synchronization information, first UE may select one of the at least two groups of synchronization resources for sending the first synchronization information, and may use another group of synchronization resources to receive synchronization information sent by another UE, for example, third synchronization information.

In other words, when using one group of synchronization resources to send the first synchronization information, the first UE may simultaneously use another group of synchronization resources to receive synchronization information sent by another UE, so as to avoid the following case: When sending the first synchronization information, the first UE cannot simultaneously detect a synchronization signal sent by the another UE, that is, another synchronization source.

According to the synchronization information sending method provided in this embodiment of the present invention, the first synchronization information is sent within the synchronization cycle by using the N synchronization subframes, so that a quantity of data symbols in the synchronization subframe can be increased while ensuring a quantity of DMRSs. This reduces a bit rate of the control channel, thereby improving performance of detecting the control channel and the first synchronization information by the second UE.

Embodiment 8

Figure 19:
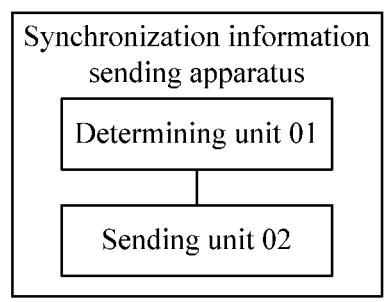
FIG. 19 is a schematic structural diagram 1 of a synchronization information sending apparatus according to an embodiment of the present invention.

FIG. 19 is a schematic structural diagram of a synchronization information sending apparatus according to this embodiment of the present invention. The synchronization information sending apparatus provided in this embodiment of the present invention may be configured to implement the methods in the embodiments of the present invention shown in FIG. 1 to FIG. 18. For ease of description, only parts related to this embodiment of the present invention are described. For technical details that are not disclosed, reference may be made to the embodiments of the present invention shown in FIG. 1 to FIG. 18.

The synchronization information sending apparatus may be specifically UE such as a mobile phone or a vehicle, for example, the first UE in Embodiment 1 to Embodiment 7.

As shown in FIG. 19, the synchronization information sending apparatus includes a determining unit 01 and a sending unit 02.

The determining unit 01 is configured to determine first synchronization information, where the first synchronization information is used to indicate a priority of the first UE used as a synchronization source.

The sending unit 02 is configured to send the first synchronization information, so that second UE selects a synchronization source of the second UE according to the received first synchronization information.

Because the first synchronization information may indicate the priority of the first UE used as a synchronization source, when selecting the synchronization source of the second UE, the second UE may select the first UE with a relatively high priority as the synchronization source of the second UE according to multiple pieces of received first synchronization information, so as to ensure reliability and precision of synchronization between UEs in a scenario of ultra-reliable and low latency communications such as the Internet of Vehicles.

Figure 20:
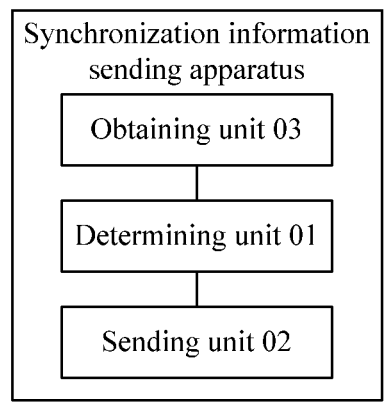
FIG. 20 is a schematic structural diagram 2 of a synchronization information sending apparatus according to an embodiment of the present invention.

Further, as shown in FIG. 20, the apparatus further includes an obtaining unit 03, configured to obtain first configuration information from a base station or in a predefined manner, where the first configuration information includes frequency information and/or timing information used for the first UE and a synchronization source of the first UE, and timing of the synchronization source of the first UE comes from a satellite device, where the first synchronization information includes: information indicating whether a frequency of a first link is a frequency of a second link; and/or information indicating whether timing for the second link comes from the satellite device; and/or information indicating whether the timing for the second link is aligned with timing of the satellite device, where the second link is a link between the first UE and the base station, and the first link is a link between the first UE and the second UE.

In this way, when the frequency of the first link is the same as the frequency of the second link and the second UE selects the first UE as the synchronization source, because timing of the second UE is the same as the timing of the base station in the second link, potential interference on a receiver of the base station or a receiver of the UE in the second link due to a timing difference can be avoided. When the timing for the second link comes from the satellite device and the second UE selects the first UE as the synchronization source, because timing of the second UE is the same as the timing of the base station in the second link, synchronization precision and stability in the first link can be improved.

Alternatively, the obtaining unit 03 is configured to obtain second configuration information from a base station or in a predefined manner, where the second configuration information includes coverage area information of a cell in which the first UE is located, and timing of a synchronization source of the first UE is unrelated to the satellite device, where the first synchronization information includes: information indicating a transmit power of the serving cell of the first UE; and/or information indicating a coverage radius of the serving cell of the first UE; and/or information indicating a TA value between the first UE and the serving cell in the second link.

The first synchronization information may reflect the synchronization source of the first UE and the coverage area information of the cell in which the first UE is located, so that when selecting the synchronization source of the second UE, the second UE can select, as the synchronization source of the second UE according to the first synchronization information, the first UE corresponding to the cell with a relatively small coverage area, thereby reducing or eliminating interference on an uplink receiver of the base station within a cell coverage area with a relatively small radius.

Further, the determining unit 01 is specifically configured to obtain the first synchronization information from a base station or in a predefined manner, where the first synchronization information includes a first sidelink synchronization signal SLSS; and the sending unit 02 is configured to send the first synchronization information if a timing delay between the first UE and the second UE satisfies a preset trigger condition.

If the first UE is located in a first cell, and the second UE is located in a second cell adjacent to the first cell, a preset trigger condition includes at least one of the following: a difference between timing of the first cell and timing of the second cell is higher than a first preset value; timing of the first cell and timing of the second cell are asynchronous; a difference between a coverage radius of the first cell and a coverage radius of the second cell is higher than a second preset value; or a difference between a transmit power of the first cell and a transmit power of the second cell is higher than a third preset value.

Correspondingly, if both the first UE and the second UE are located in a first cell, the preset trigger condition is that a TA value of the first UE in the second link is higher than a fourth preset value.

The trigger conditions for sending the first synchronization information by the first UE are added, so that the first UE can be triggered, according to these conditions, to send the SLSS, to better implement synchronization in the first link by using the SLSS that is triggered to be sent in the first link by the UE. This can reduce problems, such as a packet loss or a detection error, that occur between UEs because of a delay difference, thereby improving communication performance in the entire first link.

For example, the first synchronization information is carried on a first-link physical control channel and/or in the SLSS.

Alternatively, the determining unit 01 is configured to: receive a synchronization signal sent by the second UE; and determine the first synchronization information if the synchronization signal indicates that the second UE is remote UE and signal quality of the synchronization signal is higher than a preset threshold.

In this way, according to the foregoing process, only the relay UE sends the first synchronization information during data communication between the remote UE and relay UE, regardless of whether the remote UE is within a coverage area of the base station and regardless of signal quality of the relay UE in the second link. This implements synchronization between UEs, and reduces power consumption of the remote UE.

For example, the first synchronization information includes any one of the following: the first synchronization information indicates that timing of the first UE is the same as that of the satellite device, and the first synchronization information includes a sequence indicating that the first UE is inside a network, which means that the first UE comes from inside the network and the timing of the first UE is synchronous with that of the satellite device; the first synchronization information indicates that timing of the first UE is the same as that of the satellite device, and the first synchronization information includes a sequence indicating that the first UE is outside a network, which means that the first UE comes from outside the network and the timing of the first UE is the same as that of the satellite device; the first synchronization information indicates that timing of the first UE is different from that of the satellite device, and the first synchronization information includes a sequence indicating that the first UE is inside a network, which means that the first UE comes from inside the network and the timing of the first UE is different from that of the satellite device; or the first synchronization information indicates that timing of the first UE is different from that of the satellite device, and the first synchronization information includes a sequence indicating that the first UE is outside a network, which means that the first UE is outside the network and uses its own timing.

Figure 21:
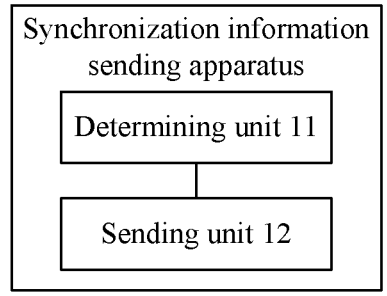
FIG. 21 is a schematic structural diagram 3 of a synchronization information sending apparatus according to an embodiment of the present invention.

FIG. 21 is a schematic structural diagram of a synchronization information sending apparatus according to an embodiment of the present invention. The synchronization information sending apparatus provided in this embodiment of the present invention may be configured to implement the methods in the embodiments of the present invention shown in FIG. 1 to FIG. 18. For ease of description, only parts related to this embodiment of the present invention are described. For technical details that are not disclosed, reference may be made to the embodiments of the present invention shown in FIG. 1 to FIG. 18.

The synchronization information sending apparatus may be specifically UE such as a mobile phone or a vehicle, for example, the first UE in Embodiment 1 and Embodiment 7.

As shown in FIG. 21, the synchronization information sending apparatus includes a determining unit 11 and a sending apparatus 12.

The determining unit 11 is configured to determine first synchronization information.

The sending unit 12 is configured to send, in a first link, the first synchronization information, where the first synchronization information is different from second synchronization information, and the first link is a link between the first UE and second UE.

That the first synchronization information is different from second synchronization information specifically includes at least one of the following: a symbol location, in a synchronization subframe, of a synchronization signal in the first synchronization information is different from a symbol location, in a synchronization subframe, of a synchronization signal in the second synchronization information; a quantity of symbols, in a synchronization subframe, of a synchronization signal in the first synchronization information is different from a quantity of symbols, in a synchronization subframe, of a synchronization signal in the second synchronization information; a sequence used for a synchronization signal in the first synchronization information is different from a sequence used for a synchronization signal in the second synchronization information; a frequency-domain mapping manner of a sequence used for a synchronization signal in the first synchronization information is different from a frequency-domain mapping manner of a sequence used for a synchronization signal in the second synchronization information; or a control channel carrying the first synchronization information is different from a control channel carrying the second synchronization information.

Specifically, that a sequence used for a synchronization signal in the first synchronization information is different from a sequence used for a synchronization signal in the second synchronization information includes at least one of the following: a first synchronization sequence used for the synchronization signal in the first synchronization information is different from a first synchronization sequence used for the synchronization signal in the second synchronization information; a second synchronization sequence used for the synchronization signal in the first synchronization information is different from a second synchronization sequence used for the synchronization signal in the second synchronization information; or a combination manner of a first synchronization sequence and a second synchronization sequence that are used for the synchronization signal in the first synchronization information is different from a combination manner of a first synchronization sequence and a second synchronization sequence that are used for the synchronization signal in the second synchronization information.

That a frequency-domain mapping manner of a sequence used for a synchronization signal in the first synchronization information is different from a frequency-domain mapping manner of a sequence used for a synchronization signal in the second synchronization information includes: a downlink secondary synchronization sequence in a subframe 5 in a second link is used as a second synchronization sequence, where the second link is a link between the first UE and a base station; and/or an even-number subcarrier and an odd-number subcarrier occupied by the second synchronization sequence are respectively corresponding to sequences corresponding to an odd-number subcarrier and an even-number subcarrier of a secondary synchronization sequence in a subframe 0 or the subframe 5 in the second link.

That a control channel carrying the first synchronization information is different from a control channel carrying the second synchronization information specifically includes at least one of the following: a demodulation reference signal used for the control channel carrying the first synchronization information is different from a demodulation reference signal used for the control channel carrying the second synchronization information; a CRC mask used for the control channel carrying the first synchronization information is different from a CRC mask used for the control channel carrying the second synchronization information; a packet size of the control channel carrying the first synchronization information is different from a packet size of the control channel carrying the second synchronization information; or an initial value or a computing parameter of an initial value, of a scrambling sequence, used for the control channel carrying the first synchronization information is different from an initial value or a computing parameter of an initial value, of a scrambling sequence, used for the control channel carrying the second synchronization information.

That a demodulation reference signal used for the control channel carrying the first synchronization information is different from a demodulation reference signal used for the control channel carrying the second synchronization information includes at least one of the following: a sequence of the demodulation reference signal used for the control channel carrying the first synchronization information is different from a sequence of the demodulation reference signal used for the control channel carrying the second synchronization information; a symbol location of the demodulation reference signal used for the control channel carrying the first synchronization information is different from a symbol location of the demodulation reference signal used for the control channel carrying the second synchronization information; or a quantity of symbols occupied by the demodulation reference signal used for the control channel carrying the first synchronization information is different from a quantity of symbols occupied by the demodulation reference signal used for the control channel carrying the second synchronization information.

For example, in a normal CP case, the control channel carrying the first synchronization information occupies symbols 3 and 6 of a first timeslot and symbols 0 and 3 of a second timeslot in the synchronization subframe, or the control channel carrying the first synchronization information occupies symbols 3 and 5 of a first timeslot and symbols 1 and 3 of a second timeslot in the synchronization subframe; and in an extended CP case, the control channel carrying the first synchronization information occupies symbols 2 and 5 of a first timeslot and a symbol 2 of a second timeslot in the synchronization subframe, or the control channel carrying the first synchronization information occupies symbols 2 and 4 of a first timeslot and symbols 0 and 2 of a second timeslot in the synchronization subframe.

In this way, the first synchronization information in an Internet-of-Vehicles system is set to be different from the second synchronization information in a D2D system, so that when performing synchronization, the second UE used as a receive end can determine whether a subsequent communication service is a D2D service or an Internet-of-Vehicles service. This simplifies detection performed by the first UE or the second UE and avoids unnecessary erroneous detection.

Further, the sending unit 12 is specifically configured to send the first synchronization information within a synchronization cycle by using N synchronization subframes, where N is a positive integer not less than 2.

The N synchronization subframes are N adjacent subframes within the synchronization cycle, or a time interval between the N synchronization subframes is 1/N of the synchronization cycle.

For example, if the N synchronization subframes include a first synchronization subframe and a second synchronization subframe, a first synchronization sequence in the first synchronization subframe is different from a first synchronization sequence in the second synchronization subframe; and/or a second synchronization sequence in the first synchronization subframe is different from a second synchronization sequence in the second synchronization subframe.

Further, the sending unit 12 is specifically configured to: send the first synchronization information by using one of the at least two groups of synchronization resources; and receive, by using another group of synchronization resources in the at least two groups of synchronization resources, third synchronization information sent by another UE.

In this way, the first synchronization information is sent within the synchronization cycle by using the N synchronization subframes, so that a quantity of data symbols in the synchronization subframe can be increased while ensuring a quantity of DMRSs. This reduces a bit rate of the control channel, thereby improving performance of detecting the control channel and the first synchronization information by the second UE.

Figure 22:
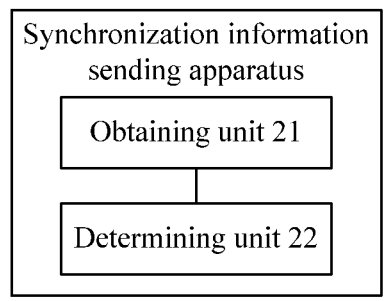
FIG. 22 is a schematic structural diagram 4 of a synchronization information sending apparatus according to an embodiment of the present invention.

FIG. 22 is a schematic structural diagram of a synchronization information sending apparatus according to an embodiment of the present invention. The synchronization information sending apparatus provided in this embodiment of the present invention may be configured to implement the methods in the embodiments of the present invention shown in FIG. 1 to FIG. 18. For ease of description, only parts related to this embodiment of the present invention are described. For technical details that are not disclosed, reference may be made to the embodiments of the present invention shown in FIG. 1 to FIG. 18.

The synchronization information sending apparatus may be specifically UE such as a mobile phone or a vehicle, for example, the second UE in Embodiment 1 to Embodiment 7.

As shown in FIG. 22, the synchronization information sending apparatus includes an obtaining unit 21 and a determining unit 22.

The obtaining unit 21 is configured to obtain first synchronization information, where the first synchronization information is used to indicate a priority of first UE used as a synchronization source.

The determining unit 22 is configured to determine, according to the first synchronization information, whether to use the first UE as a synchronization source of the second UE.

Further, the determining unit 22 is specifically configured to: if a frequency of the first link is a frequency of the second link, use, by the second UE, the first UE as the synchronization source of the second UE; or if timing for the second link comes from a satellite device, use, by the second UE, the first UE as the synchronization source of the second UE; or if a frequency of the first link is a frequency of the second link and timing for the second link comes from a satellite device, use, by the second UE, the first UE as the synchronization source of the second UE.

The first synchronization information includes: information indicating whether the frequency of the first link is the frequency of the second link; and/or information indicating whether the timing for the second link comes from the satellite device; and/or information indicating whether the timing for the second link is aligned with timing of the satellite device, where the second link is a link between the first UE and a base station, and the first link is a link between the first UE and the second UE.

Alternatively, the determining unit 22 is specifically configured to: if a transmit power of a cell in which the first UE is located is lower than a first threshold, use, by the second UE, the first UE as the synchronization source of the second UE; and/or if a coverage radius of the cell in which the first UE is located is lower than a second threshold, use, by the second UE, the first UE as the synchronization source of the second UE; and/or if a TA value of the first UE in the second link is lower than a third threshold, use, by the second UE, the first UE as the synchronization source of the second UE.

The first synchronization information includes: information indicating the transmit power of the cell in which the first UE is located; and/or information indicating the coverage radius of the cell in which the first UE is located; and/or information indicating the timing advance TA value of the first UE in the second link.

Alternatively, the determining unit 22 is specifically configured to select a synchronization source with a highest priority, and when signal quality of the synchronization source with the highest priority is lower than a signal quality threshold corresponding to the synchronization source with the highest priority, select, as the synchronization source of the second UE, a synchronization source whose priority is lower than that of the synchronization source with the highest priority, where the first synchronization information includes priority information of synchronization sources of different types and/or synchronization signal quality thresholds of synchronization sources of different types.

Alternatively, the determining unit 22 is specifically configured to use, by the second UE, the first UE as the synchronization source of the second UE if timing source information of the first UE indicates that timing of the first UE comes from a satellite device and network coverage information of the first UE indicates that the first UE is outside a network coverage area, where the first synchronization information includes the timing source information of the first UE and the network coverage information of the first UE.

Figure 23:
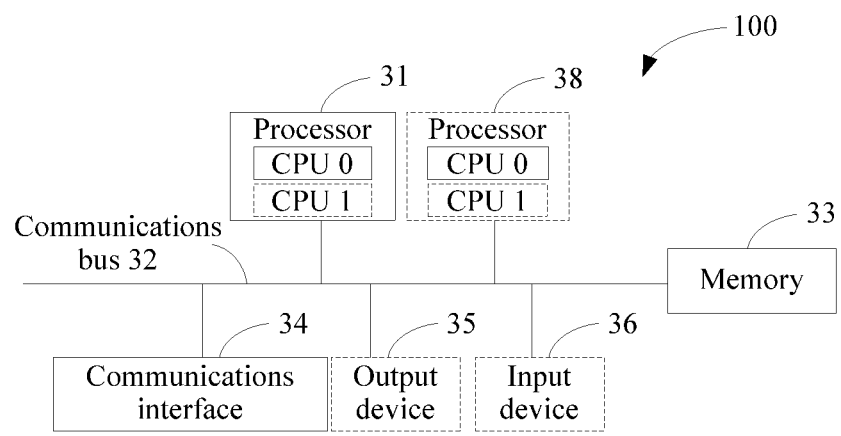
FIG. 23 is a schematic structural diagram of user equipment according to an embodiment of the present invention.

In addition, as shown in FIG. 23, the synchronization information sending apparatuses in FIG. 19 to FIG. 22 may be implemented as user equipment UE in FIG. 23.

FIG. 23 is a schematic diagram of user equipment according to an embodiment of the present invention. User equipment 100 includes at least one processor 31, a communications bus 32, a memory 33, and at least one communications interface 34. In addition, the processor 31, the communications interface 34, and the memory 33 communicate with each other by using the communications bus 32.

For example, the determining units or, 11, and 22, the sending units 02 and 12, and the obtaining units 03 and 21 may be implemented by invoking an instruction in the memory 33 by the processor 31 shown in FIG. 23.

Specifically, the memory 33 is configured to store a computer executable instruction; the processor 31 is connected to the memory 33 by using the communications bus 32; and when the user equipment 100 runs, the processor 31 executes the computer executable instruction stored in the memory 33, so that the user equipment 100 executes the synchronization information sending methods shown in FIG. 1 to FIG. 18.

The processor 31 may be a central processing unit (CPU). The processor 31 may alternatively be another general purpose processor, a digital signal processor (DSP), an application-specific integrated circuit (ASIC), a field-programmable gate array (FPGA), another programmable logic device, a discrete gate or transistor logic device, a discrete hardware component, or the like. The general purpose processor may be a microprocessor, or the processor may be any conventional processor or the like.

The processor 31 is a control center of the user equipment 100. The processor 31 processes data received by the communications interface 34, and calls software in the memory 33 or invokes a program in the memory 33, to execute various functions of the user equipment 100.

The communications bus 32 may include a channel and transfers information between the foregoing components. The communications interface 34 uses any transceiver like apparatus to communicate with another device or a communications network, such as an Ethernet, a radio access network (RAN), or a wireless local area network (WLAN).

The memory 33 may be a read-only memory (ROM) or another type of static storage device that may store static information and instructions, or a random access memory (RAM) or another type of dynamic storage device that may store information and instructions; or may be an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, or the like), a magnetic disk storage medium, another magnetic storage device, or any other medium that can be used to carry or store expected program code in a structural form of an instruction or data and that can be accessed by a computer, but is not limited thereto. The memory may exist independently, and is connected to the processor by using the bus. Alternatively, the memory may be integrated with the processor.

The memory 33 is configured to store and execute application program code in the solutions of the present invention, and the processor 31 controls the execution. The processor 31 is configured to execute the application program code stored in the memory 33.

During specific implementation, in an embodiment, the processor 31 may include one or more CPUs, for example, a CPU 0 and a CPU 1 in FIG. 23.

During specific implementation, in an embodiment, the user equipment 100 may include a plurality of processors, for example, the processor 31 and a processor 38 in FIG. 23. Each of the processors may be a single-core processor (single-CPU), or may be a multi-core processor (multi-CPU). The processors herein may be one or more devices, circuits, and/or processing cores for processing data (for example, computer program instructions).

During specific implementation, in an embodiment, the user equipment 100 may further include an output device 35 and an input device 36. The output device 35 communicates with the processor 31, and may display information in a plurality of manners. For example, the output device 35 may be a liquid crystal display (liquid crystal display, LCD), a light emitting diode (light emitting diode, LED) display device, a cathode ray tube (cathode ray tube, CRT) display device, a projector, or the like. The input device 36 communicates with the processor 31, and may receive a user input in a plurality of manners. For example, the input device 36 may be a mouse, a keyboard, a touchscreen device, a sensor device, or the like.

The foregoing user equipment 100 may be a general purpose computer device or a dedicated computer device. During specific implementation, the user equipment 100 may be an in-vehicle computer, a portable computer, a network server, a personal digital assistant (PDA), a mobile phone, a tablet computer, a wireless terminal device, a communications device, an embedded device, or a device with a structure similar to that in FIG. 23. A type of the user equipment 100 is not limited in this embodiment of the present invention.

The synchronization information sending apparatus provided in this embodiment of the present invention may send first synchronization information to second UE that needs to be synchronized. Because the first synchronization information may indicate a priority of first UE used as a synchronization source, when selecting a synchronization source of the second UE, the second UE may select the first UE with a relatively high priority as the synchronization source of the second UE according to multiple pieces of received first synchronization information, so as to ensure reliability and precision of synchronization between UEs in a scenario of ultra-reliable and low latency communications such as the Internet of Vehicles.

It may be clearly understood by a person skilled in the art that, for convenient and brief description, division of the foregoing functional modules is used as an example for description. In actual application, the foregoing functions can be allocated to different functional modules and implemented according to a requirement, that is, an inner structure of an apparatus is divided into different functional modules to implement all or some of the functions described above. For detailed working processes of the foregoing systems, apparatuses, and units, reference may be made to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or at least two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by a first user equipment (UE), first synchronization information; and sending, in a first link by the first UE, the first synchronization information, wherein a sequence used for the first synchronization information is different from a sequence used for second synchronization information, the first link is between the first UE and a second UE, the second synchronization information is carried on a second link, the second link is between the first UE and a base station, wherein the difference between the sequence used for the first synchronization information and the sequence used for second synchronization information is usable to determine whether a synchronization information is the first synchronization information to be carried on the first link or the second synchronization information to be carried second link, the second synchronization information comprises a Primary Sidelink Synchronization Signal (PSSS) and a Secondary Sidelink Synchronization Signal (SSSS), a sequence used for the PSSS is generated using a Zadoff-Chu sequence with a length of 63, and the sequence used for the PSSS comprises a root sequence with a number of 26 and a root sequence with a number of 37, a sequence used for the SSSS comprises a sequence in downlink subframe 0, and a mapping manner of the sequence used for the SSSS satisfies a formula (1) as follows:

$$d(2n)=s_0^{(m_0)}(n)c_0(n)$$

$$d(2n+1)=s_1^{(m_0)}(n)c_1(n)z_1^{(m_0)}(n) \qquad (1),$$

wherein d(2n) indicates a sequence mapped to an even-number subcarrier, d(2n+1) indicates a sequence mapped to an odd-number subcarrier, $s_0^{(m_0)}(n)$ and $c_0(n)$ are sequences for generating d(2n), and $s_1^{(m_1)}(n)$, $c_1(n)$, and $z_1^{(m_0)}(n)$ are sequences for generating d(2n+1).

2. The method according to claim 1, wherein:
a symbol location, in a synchronization subframe, of a synchronization signal in the first synchronization information is different from a symbol location, in a synchronization subframe, of a first synchronization signal in the second synchronization information;
a quantity of symbols, in a synchronization subframe, of a synchronization signal in the first synchronization information is different from a quantity of symbols, in a synchronization subframe, of a first synchronization signal in the second synchronization information;
a frequency-domain mapping manner of a sequence used for a synchronization signal in the first synchronization information is different from a frequency-domain mapping manner of a sequence used for a first synchronization signal in the second synchronization information; or
a control channel carrying the first synchronization information is different from a control channel carrying the second synchronization information.

3. The method according to claim 2, wherein the synchronization signal in the first synchronization information comprises a first synchronization sequence followed by a second synchronization sequence, wherein the first synchronization signal in the second synchronization information comprises a first synchronization sequence followed by a second synchronization sequence, and wherein:
the first synchronization sequence comprised in the synchronization signal in the first synchronization information is different from the first synchronization sequence comprised in the first synchronization signal in the second synchronization information; or a combination manner of the first synchronization sequence and the second synchronization sequence comprised in the synchronization signal in the first synchronization information is different from a combination manner of the first synchronization sequence and the second synchronization sequence comprised in the first synchronization signal in the second synchronization information.

4. The method according to claim 2, wherein:
a downlink secondary synchronization sequence in a subframe 5 in a second link is used as a second synchronization sequence; or
an even-number subcarrier and an odd-number subcarrier occupied by the second synchronization sequence respectively correspond to sequences corresponding to an odd-number subcarrier and an even-number subcarrier of a secondary synchronization sequence in a subframe 0 or the subframe 5 in the second link.

5. The method according to claim 2, wherein:
a demodulation reference signal used for the control channel carrying the first synchronization information is different from a demodulation reference signal used for the control channel carrying the second synchronization information;
a cyclic redundancy check (CRC) mask used for the control channel carrying the first synchronization information is different from a CRC mask used for the control channel carrying the second synchronization information;
a packet size of the control channel carrying the first synchronization information is different from a packet size of the control channel carrying the second synchronization information; or
a first initial value of a first scrambling sequence or a first computing parameter of the first initial value used for the control channel carrying the first synchronization information is different from a second initial value of a second scrambling sequence or a computing parameter of the second initial value used for the control channel carrying the second synchronization information.

6. The method according to claim 5, wherein:
a sequence of the demodulation reference signal used for the control channel carrying the first synchronization information is different from a sequence of the demodulation reference signal used for the control channel carrying the second synchronization information;
a symbol location of the demodulation reference signal used for the control channel carrying the first synchronization information is different from a symbol location of the demodulation reference signal used for the control channel carrying the second synchronization information; or
a quantity of symbols occupied by the demodulation reference signal used for the control channel carrying the first synchronization information is different from a quantity of symbols occupied by the demodulation reference signal used for the control channel carrying the second synchronization information.

7. An apparatus, comprising:
a processor, configured to determine first synchronization information; and
a transmitter, configured to send the first synchronization information in a first link, wherein a sequence used for the first synchronization information is different from a sequence used for second synchronization information, the first link is between a first user equipment (UE) and a second UE, the second synchronization information is carried on a second link, the second link is between the first UE and a base station, wherein the difference between the sequence used for the first synchronization information and the sequence used for second synchronization information is usable to determine whether a synchronization information is the first synchronization information to be carried on the first link or the second synchronization information to be carried on the second link, the second synchronization information comprises a Primary Sidelink Synchronization Signal (PSSS) and a Secondary Sidelink Synchronization Signal (SSSS), a sequence used for the PSSS is generated by using a Zadoff-Chu sequence with a length of 63, and the sequence used for the PSSS comprises a root sequence with a number of 26 and a root sequence with a number of 37, a sequence used for the SSSS comprises a sequence in downlink subframe 0, and a mapping manner of the sequence used for the SSSS satisfies a formula (1) as follows:

$$d(2n) = s_0^{(m_0)}(n) c_0(n)$$

$$d(2n+1) = s_1^{(m_1)}(n) c_1(n) z_1^{(m_0)}(n) \quad (1),$$

wherein $d(2n)$ indicates a sequence mapped to an even-number subcarrier, $d(2n+1)$ indicates a sequence mapped to an odd-number subcarrier, $s_0^{(m_0)}(n)$ and $c_0(n)$ are sequences for generating $d(2n)$, and $s_1^{(m_1)}(n)$, $c_1(n)$, and $z_1^{(m_0)}(n)$ are sequences for generating $d(2n+1)$.

8. The apparatus according to claim 7, wherein:
a symbol location, in a synchronization subframe, of a synchronization signal in the first synchronization information is different from a symbol location, in a synchronization subframe, of a first synchronization signal in the second synchronization information;
a quantity of symbols, in a synchronization subframe, of a synchronization signal in the first synchronization information is different from a quantity of symbols, in a synchronization subframe, of a first synchronization signal in the second synchronization information;
a frequency-domain mapping manner of a sequence used for a synchronization signal in the first synchronization information is different from a frequency-domain mapping manner of a sequence used for a first synchronization signal in the second synchronization information; or
a control channel carrying the first synchronization information is different from a control channel carrying the second synchronization information.

9. The apparatus according to claim 8, wherein the synchronization signal in the first synchronization information comprises a first synchronization sequence followed by a second synchronization sequence, wherein the first synchronization signal in the second synchronization information comprises a first synchronization sequence followed by a second synchronization sequence, and wherein:
the first synchronization sequence comprised in the synchronization signal in the first synchronization information is different from the first synchronization sequence comprised in the first synchronization signal in the second synchronization information; or
a combination manner of the first synchronization sequence and the second synchronization sequence comprised in the synchronization signal in the first synchronization information is different from a combination manner of the first synchronization sequence and the second synchronization sequence comprised in the first synchronization signal in the second synchronization information.

10. The apparatus according to claim 8, wherein:
a downlink secondary synchronization sequence in a subframe 5 in a second link is used as a second synchronization sequence; or
an even-number subcarrier and an odd-number subcarrier occupied by the second synchronization sequence respectively correspond to sequences corresponding to an odd-number subcarrier and an even-number subcarrier of a secondary synchronization sequence in a subframe 0 or the subframe 5 in the second link.

11. The apparatus according to claim 8, wherein:
a demodulation reference signal used for the control channel carrying the first synchronization information is different from a demodulation reference signal used for the control channel carrying the second synchronization information;
a cyclic redundancy check (CRC) mask used for the control channel carrying the first synchronization information is different from a CRC mask used for the control channel carrying the second synchronization information;
a packet size of the control channel carrying the first synchronization information is different from a packet size of the control channel carrying the second synchronization information; or
a first initial value of a first scrambling sequence or a first computing parameter of the first initial value used for the control channel carrying the first synchronization information is different from a second initial value of a second scrambling sequence or a computing parameter of the second initial value used for the control channel carrying the second synchronization information.

12. The apparatus according to claim 11, wherein:
a sequence of the demodulation reference signal used for the control channel carrying the first synchronization information is different from a sequence of the demodulation reference signal used for the control channel carrying the second synchronization information;
a symbol location of the demodulation reference signal used for the control channel carrying the first synchronization information is different from a symbol location of the demodulation reference signal used for the control channel carrying the second synchronization information; or
a quantity of symbols occupied by the demodulation reference signal used for the control channel carrying the first synchronization information is different from a quantity of symbols occupied by the demodulation reference signal used for the control channel carrying the second synchronization information.

13. A non-transitory computer-readable storage medium comprising instructions which, when executed by a computer, cause the computer to:
determine first synchronization information; and
send the first synchronization information in a first link, wherein a sequence used for the first synchronization information is different from a sequence used for second synchronization information, the first link is between a first user equipment (UE) and a second UE, the second synchronization information is carried on a second link, the second link is between the first UE and a base station, wherein the difference between the sequence used for the first synchronization information and the sequence used for second synchronization information is usable to determine whether a synchronization information is the first synchronization information to be carried on the first link or the second synchronization information to be carried on the second link, the second synchronization information comprises a Primary Sidelink Synchronization Signal (PSSS) and a Secondary Sidelink Synchronization Signal (SSSS), a sequence used for the PSSS is generated by using a Zadoff-Chu sequence number a length of 63, and a sequence used for the PSSS comprises a root sequence with a length of 26 and a root sequence with a number of 37, the sequence used for the SSSS comprises a sequence in downlink subframe 0, and a mapping manner of the sequence used for the SSSS satisfies a formula (1) as follows:

$$d(2n) = s_0^{(m_0)}(n) c_0(n)$$

$$d(2n+1) = s_1^{(m_1)}(n) c_1(n) z_1^{(m_0)}(n) \qquad (1),$$

where d(2n) indicates a sequence mapped to an even-number subcarrier, d(2n+1) indicates a sequence mapped to an odd-number subcarrier, $s_0^{(m_0)}(n)$ and $c_0(n)$ are sequences for generating d(2n), and $s_1^{(m_1)}(n)$, $c_1(n)$, and $z_1^{(m_0)}(n)$ are sequences for generating d(2n+1).

14. The non-transitory computer-readable storage medium according to claim 13, wherein:
a symbol location, in a synchronization subframe, of a synchronization signal in the first synchronization information is different from a symbol location, in a synchronization subframe, of a first synchronization signal in the second synchronization information;
a quantity of symbols, in a synchronization subframe, of a synchronization signal in the first synchronization information is different from a quantity of symbols, in a synchronization subframe, of a first synchronization signal in the second synchronization information;
a frequency-domain mapping manner of a sequence used for a synchronization signal in the first synchronization information is different from a frequency-domain mapping manner of a sequence used for a first synchronization signal in the second synchronization information; or
a control channel carrying the first synchronization information is different from a control channel carrying the second synchronization information.

15. The non-transitory computer-readable storage medium according to claim 14, wherein the synchronization signal in the first synchronization information comprises a first synchronization sequence followed by a second synchronization sequence, wherein the first synchronization signal in the second synchronization information comprises a first synchronization sequence followed by a second synchronization sequence, and wherein:
the first synchronization sequence comprised in the synchronization signal in the first synchronization information is different from the first synchronization sequence comprised in the first synchronization signal in the second synchronization information; or
a combination manner of the first synchronization sequence and the second synchronization sequence comprised in the synchronization signal in the first synchronization information is different from a combination manner of the first synchronization sequence and the second synchronization sequence comprised in the first synchronization signal in the second synchronization information.

16. The non-transitory computer-readable storage medium according to claim 14, wherein:
a downlink secondary synchronization sequence in a subframe 5 in a second link is used as a second synchronization sequence; or
an even-number subcarrier and an odd-number subcarrier occupied by the second synchronization sequence respectively correspond to sequences corresponding to an odd-number subcarrier and an even-number subcarrier of a secondary synchronization sequence in a subframe 0 or the subframe 5 in the second link.

17. The non-transitory computer-readable storage medium according to claim 14, wherein:
a demodulation reference signal used for the control channel carrying the first synchronization information is different from a demodulation reference signal used for the control channel carrying the second synchronization information;
a cyclic redundancy check (CRC) mask used for the control channel carrying the first synchronization information is different from a CRC mask used for the control channel carrying the second synchronization information;
a packet size of the control channel carrying the first synchronization information is different from a packet size of the control channel carrying the second synchronization information; or
a first initial value of a first scrambling sequence or a first computing parameter of the first initial value used for the control channel carrying the first synchronization information is different from a second initial value of a second scrambling sequence or a computing parameter of the second initial value used for the control channel carrying the second synchronization information.

18. The non-transitory computer-readable storage medium according to claim 17, wherein:
a sequence of the demodulation reference signal used for the control channel carrying the first synchronization information is different from a sequence of the demodulation reference signal used for the control channel carrying the second synchronization information;
a symbol location of the demodulation reference signal used for the control channel carrying the first synchronization information is different from a symbol location of the demodulation reference signal used for the control channel carrying the second synchronization information; or
a quantity of symbols occupied by the demodulation reference signal used for the control channel carrying the first synchronization information is different from a quantity of symbols occupied by the demodulation reference signal used for the control channel carrying the second synchronization information.

* * * * *

UNITED STATES PATENT AND TRADEMARK OFFICE
CERTIFICATE OF CORRECTION

PATENT NO. : 10,925,026 B2
APPLICATION NO. : 16/040299
DATED : February 16, 2021
INVENTOR(S) : Li et al.

Page 1 of 1

It is certified that error appears in the above-identified patent and that said Letters Patent is hereby corrected as shown below:

In the Claims

In Column 43, Lines 26-29, Claim 1, delete the formula (1) and insert:

$$d(2n) = s_0^{(m_0)}(n)c_0(n)$$
$$d(2n+1) = s_1^{(m_1)}(n)c_1(n)z_1^{(m_0)}(n) \qquad (1), --.$$
-- --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*